United States Patent
Ohmori et al.

(10) Patent No.: US 7,625,612 B2
(45) Date of Patent: Dec. 1, 2009

(54) RETARDATION FILM, POLARIZING ELEMENT, LIQUID CRYSTAL PANEL, AND LIQUID CRYSTAL APPARATUS

(75) Inventors: Yutaka Ohmori, Osaka (JP); Michie Sakamoto, Osaka (JP); Hisae Sugihara, Osaka (JP); Akinori Izaki, Osaka (JP)

(73) Assignee: Nitto Denko Corporation, Ibaraki-shi (JP)

(*) Notice: Subject to any disclaimer, the term of this patent is extended or adjusted under 35 U.S.C. 154(b) by 258 days.

(21) Appl. No.: 11/344,577

(22) Filed: Feb. 1, 2006

(65) Prior Publication Data

US 2006/0177607 A1 Aug. 10, 2006

(30) Foreign Application Priority Data

Feb. 8, 2005 (JP) .............................. 2005-031678

(51) Int. Cl.
*G02F 1/1335* (2006.01)
(52) U.S. Cl. ......................................... 428/1.3; 349/118
(58) Field of Classification Search ................. 428/1.1, 428/1.3, 1.31, 1.33; 525/330.3, 383, 386; 349/96, 117–118
See application file for complete search history.

(56) References Cited

U.S. PATENT DOCUMENTS

| | | | | |
|---|---|---|---|---|
| 5,343,317 A * | 8/1994 | Wada et al. | ................. | 349/119 |
| 5,360,582 A * | 11/1994 | Boyd et al. | ................. | 252/582 |
| 6,565,974 B1 * | 5/2003 | Uchiyama et al. | .......... | 428/412 |
| 7,012,663 B2 | 3/2006 | Ono et al. | | |
| 2002/0135728 A1 * | 9/2002 | Tatsuta et al. | ............... | 349/158 |
| 2004/0125291 A1 * | 7/2004 | Kawahara et al. | ............. | 349/117 |
| 2004/0263731 A1 * | 12/2004 | Hata | ............................ | 349/118 |
| 2005/0018328 A1 * | 1/2005 | Hata et al. | ................... | 359/883 |
| 2005/0064328 A1 * | 3/2005 | Goto | ......................... | 430/270.1 |

FOREIGN PATENT DOCUMENTS

| | | |
|---|---|---|
| CN | 1491370 A | 4/2004 |
| JP | 2001-91743 | 4/2001 |
| JP | 2002-221622 | 8/2002 |
| JP | 2005091900 A * | 4/2005 |

OTHER PUBLICATIONS

Machine translation of Higuchi et al. (JP 2005-091900).*
Chinese Office Action dated Apr. 6, 2007, Application No. 2006100032934.

* cited by examiner

*Primary Examiner*—David R Sample
*Assistant Examiner*—Sophie Hon
(74) *Attorney, Agent, or Firm*—Westerman, Hattori, Daniels & Adrian, LLP

(57) ABSTRACT

There is provided a retardation film including a stretched film of a polymer film having an absolute value of photoelastic coefficient (m$^2$/N) of $50 \times 10^{-12}$ or less measured by using light of a wavelength of 550 nm at 23° C., which satisfies the following expressions (1) and (2):

$$\mathrm{Re}[450] < \mathrm{Re}[550] < \mathrm{Re}[650] \quad (1)$$

$$\mathrm{Rth}[550] < \mathrm{Re}[550] \quad (2).$$

In the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.

19 Claims, 7 Drawing Sheets

RETARDATION FILM, POLARIZING ELEMENT, LIQUID CRYSTAL PANEL, AND LIQUID CRYSTAL APPARATUS

This application claims priority under 35 U.S.C. Section 119 to Japanese Patent Application No. 2005-31678 filed on Feb. 8, 2005, which is herein incorporated by reference.

1. Field of the Invention

The present invention relates to a retardation film, to a polarizing element, a liquid crystal panel and a liquid crystal display apparatus all using the retardation film.

2. Description of the Related Art

A liquid crystal display apparatus has attracted attention for its properties such as being thin, being lightweight, and having low power consumption, and is widely used in: portable devices such as a cellular phone and a watch; office automation (OA) devices such as a personal computer monitor and a laptop personal computer; and home appliances such as a video camera and a liquid crystal television. The use of the liquid crystal display apparatus has spread because disadvantages in that its display properties vary depending on an angle from which a screen is viewed and that the liquid crystal display apparatus cannot operate at high temperatures and very low temperatures have been overcome by technical innovations. However, wide-ranging uses have changed the property required for each use. For example, a conventional liquid crystal display apparatus has only to have viewing angle property of a contrast ration between white/black displays of about 10 in an oblique direction. This definition derives from a contrast ratio of black ink printed on white paper of newspapers, magazines, and the like. However, the use of the liquid crystal display apparatus for a large stationary television requires a display that can be viewed well from different viewing angles because several persons view a screen at the same time. That is, a contrast ratio between white/black displays must be 20 or more, for example. A person viewing four corners of a screen of a large display without moving is comparable to a person viewing the screen from different viewing angle directions. Thus, it is important that the liquid crystal panel have uniform contrast or display without color unevenness across the entire screen.

Thus, the liquid crystal display apparatus employs various retardation films for improving viewing angle properties. However, a large liquid crystal display apparatus employing a conventional retardation film has problems such as reduction in contrast ratio in an oblique direction and coloring (also referred to as color shift in an oblique direction) of an image varying depending on a viewing angle, to thereby provide non-uniform display across an entire screen of a liquid crystal panel. In addition, backlight of a liquid crystal display apparatus turned on for a long period of time causes a problem of shift or unevenness in retardation values of the retardation film due to shrinkage stress of a polarizer or heat of backlight, to thereby further degrade display uniformity of the screen.

Conventionally, there is proposed as a retardation film a stretched film of a polymer film having property of providing a smaller retardation value with a shorter wavelength (also referred to as reverse wavelength dispersion property) (JP 2002-221622 A and JP2001-091743A, for example). Other examples of the retardation film include: a stretched film of a polymer film containing as a main component a polycarbonate copolymer having a fluorene repeating unit (JP 2002-221622 A); and a stretched film of a polymer film containing as a main component a cellulose ester (JP 2001-091743 A). However, those stretched films of polymer films each have problems in that shift or unevenness in retardation values is easily caused and a liquid crystal display apparatus employing each of those stretched films provides non-uniform display. Further, the stretched films of polymer films each have a problem in that desired optical properties (such as retardation values and refractive index profile) are hardly obtained.

SUMMARY OF THE INVENTION

The present invention has been made in view of solving the above-mentioned problems, and an object of the present invention is to provide a thin retardation film having a small absolute value of photoelastic coefficient, exhibiting reverse wavelength dispersion property, having excellent formability, and providing a liquid crystal display apparatus with improved display properties or display uniformity.

The inventors of the present invention have conducted intensive studies for achieving the above-mentioned object, and have found that the object can be achieved by a retardation film, a polarizing element and a liquid crystal panel described below. Thus, the present invention has been completed.

According to one aspect of the invention, a retardation film is provided. The retardation film includes a stretched film of a polymer film having an absolute value of photoelastic coefficient ($m^2/N$) of $50 \times 10^{-12}$ or less measured by using light of a wavelength of 550 nm at 23° C., which satisfies the following expressions (1) and (2):

$$Re[450] < Re[550] < Re[650] \quad (1)$$

$$Rth[550] < Re[550] \quad (2).$$

In the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.

In one embodiment of the invention, the retardation film has a thickness of 20 μm to 200 μm.

In another embodiment of the invention, the retardation film has Re[550] of 20 nm to 400 nm.

In still another embodiment of the invention, the retardation film has Re[450]/Re[550] of 0.70 to 0.99.

In still another embodiment of the invention, the retardation film has an Nz coefficient of more than 0 and less than 1.

In still another embodiment of the invention, the retardation film has Rth[550] of 10 nm to 200 nm.

In still another embodiment of the invention, the polymer film has a glass transition temperature (Tg) of 90° C. to 185° C.

In still another embodiment of the invention, the polymer film contains as a main component a polyacetal-based resin having a chemical structure represented by the following general formula (I).

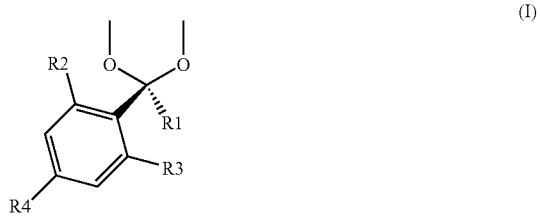

In the general formula (I): R1 represents a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group, a nitro group, an amino group, a hydroxyl group, a cyano group, or a thiol group; and R2 and R3 are not hydrogen atoms simultaneously.

In still another embodiment of the invention, the polymer film contains as a main component a polyvinyl acetal-based resin having a chemical structure represented by the following general formula (II).

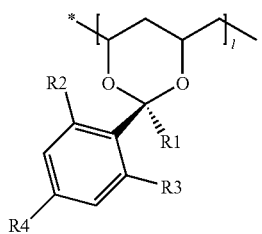

(II)

In the general formula (II): R1 represents a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group, a nitro group, an amino group, a hydroxyl group, a cyano group, or a thiol group; R2 and R3 are not hydrogen atoms simultaneously; and l represents an integer of 1 or more.

In still another embodiment of the invention, the polymer film contains as a main component a polyvinyl acetal-based resin having a chemical structure represented by the following general formula (III).

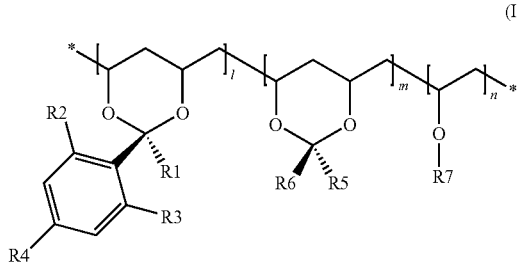

(III)

In the general formula (III): R1, R5, and R6 each independently represent a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group, a nitro group, an amino group, a hydroxyl group, a cyano group, or a thiol group; R2 and R3 are not hydrogen atoms simultaneously; R7 represents a hydrogen atom, a straight, branched, or cyclic alkyl group having 1 to 8 carbon atoms, a benzyl group, a silyl group, a phosphoric group, an acyl group, a benzoyl group, or a sulfonyl group; and l, m, and n each represent an integer of 1 or more. More specifically, l is 5 to 30 mol %, m is 20 to 80 mol %, and n is 1 to 70 mol % with respect to a total of l, m, and n as 100 mol %.

According to another aspect of the invention, a polarizing element is provided. The polarizing element includes a retardation film and a polarizer. The retardation film includes a stretched film of a polymer film having an absolute value of photoelastic coefficient $(m^2/N)$ of $50 \times 10^{-12}$ or less measured by using light of a wavelength of 550 nm at 23° C.; and the retardation film satisfies the following expressions (1) and (2):

$$Re[450] < Re[550] < Re[650] \quad (1)$$

$$Rth[550] < Re[550] \quad (2).$$

In the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.

In one embodiment of the invention, the retardation film and the polarizer are laminated directly.

In another embodiment of the invention, the retardation film and the polarizer are laminated through an adhesive layer.

In still another embodiment of the invention, the polarizing element further includes a protective layer between the retardation film and the polarizer.

According to still another aspect of the invention, a liquid crystal panel is provided. The liquid crystal panel includes a polarizing element including a retardation film and a polarizer; and a liquid crystal cell. The retardation film in the polarizing element includes a stretched film of a polymer film having an absolute value of photoelastic coefficient $(m^2/N)$ of $50 \times 10^{-12}$ or less measured by using light of a wavelength of 550 nm at 23° C.; and the retardation film satisfies the following expressions (1) and (2):

$$Re[450] < Re[550] < Re[650] \quad (1)$$

$$Rth[550] < Re[550] \quad (2).$$

In the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.

In one embodiment of the invention, the polarizing element is arranged on one side of the liquid crystal cell.

In another embodiment of the invention, the polarizing element is arranged on both sides of the liquid crystal cell.

In still another embodiment of the invention, a drive mode of the liquid crystal panel includes a TN mode, a VA mode, an IPS mode, a homogeneous ECB mode, an OCB mode, and an HAN mode.

According to still another aspect of the invention, a liquid crystal display apparatus is provided. The liquid crystal display apparatus includes the above-described liquid crystal panel.

The present invention can actually provide a retardation film having a small photoelastic coefficient and satisfying the below-indicated expressions (1) and (2). As a result, a liquid crystal display apparatus having excellent display properties can be provided, and display unevenness of a screen of the liquid crystal display apparatus, which is a problem of a liquid crystal display apparatus employing a conventional retardation film, can be prevented. No retardation film having a small absolute value of photoelastic coefficient and satisfying the below-indicated expressions (1) and (2) has been heretofore obtained. In contrast, according to the present invention, a shrinkable film having a predetermined shrinkage ratio is attached to each side of a polymer film containing as a main component polyvinyl acetal having a specific structure, and the whole is heat stretched, to thereby actually provide a retardation film having a small absolute value of photoelastic coefficient and having desired optical properties. The polymer film has excellent formability, stretchability, and stability of retardation values. Further, the polymer film has excellent orientation property by being stretched, and thus the polymer film with a much smaller thickness than that of a conventional film can achieve desired retardation values (such as retardation values of $\lambda/2$ and $\lambda/4$).

$$\mathrm{Re}[450] < \mathrm{Re}[550] < \mathrm{Re}[650] \tag{1}$$

$$\mathrm{Rth}[550] < \mathrm{Re}[550] \tag{2}$$

Note that Re[450], Re[550] and Re[650] respectively represent in-plane retardation values determined by using light of wavelengths of 450 nm, 550 nm, and 650 nm at 23° C., and Rth[550] represents a thickness direction retardation value determined by using light of a wavelength of 550 nm at 23° C.

DETAILED DESCRIPTION OF THE INVENTION

A. Retardation film

A-1. Overview of Retardation Film

Figure 1:
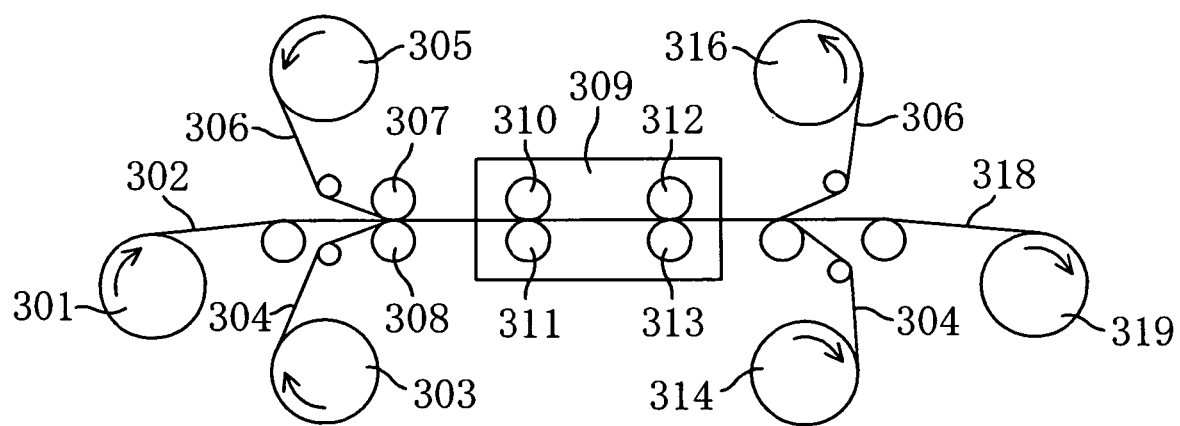
FIG. 1 is a schematic view showing a concept of a typical production process of a retardation film according to the present invention.

The retardation film according to an embodiment of the present invention includes a stretched film of a polymer film having an absolute value of photoelastic coefficient ($m^2$/N) of $50 \times 10^{-12}$ or less measured by using light of a wavelength of 550 nm at 23° C.; and the retardation film satisfies the following expressions (1) and (2).

$$\mathrm{Re}[450] < \mathrm{Re}[550] < \mathrm{Re}[650] \tag{1}$$

$$\mathrm{Rth}[550] < \mathrm{Re}[550] \tag{2}$$

In the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.

The retardation film according to an embodiment of the present invention is generally arranged on at least one side of a liquid crystal cell. As a result, light leak from an oblique direction of a liquid crystal display apparatus can be reduced. Further, a contrast ratio in an oblique direction of the liquid crystal display apparatus can be increased, and a color shift in an oblique direction of the liquid crystal display apparatus can be reduced. In addition, the retardation film can be used as a wave plate, for example, a $\lambda/4$ plate with an in-plane retardation value of about ¼ wavelength of light (generally, visible light region) or a $\lambda/2$ plate with an in-plane retardation value of about ½ wavelength of light (generally, visible light region). However, use of the retardation film of the present invention is not limited to those uses.

A thickness of the retardation film may be selected appropriately depending on the purpose. According to an embodiment of the present invention, the retardation film has a thickness of preferably 20 μm to 200 μm, and more preferably 30 μm to 180 μm. In a case where the retardation film is used as a $\lambda/4$ plate, the retardation film has a thickness of preferably 40 μm to 140 μm, and particularly preferably 60 μm to 120 μm. In a case where the retardation film is used as a $\lambda/2$ plate, the retardation film has a thickness of preferably 130 μm to 230 μm, and particularly preferably 150 μm to 210 μm. A thickness within the above ranges can provide a retardation film having excellent mechanical strength or optical uniformity and satisfying optical properties described in the section A-2 below.

A-2. Optical Properties of Retardation Film

In the specification of the present invention, Re[550] refers to an in-plane retardation value measured by using light of a wavelength of 550 nm at 23° C. Re[550] can be determined from an expression of $\mathrm{Re}[550] = (n_x - n_y) \times d$ (wherein, $n_x$ and $n_y$ respectively represent refractive indices of the retardation film in a slow axis direction and a fast axis direction at a wavelength of 550 nm, and d (nm) represents a thickness of the retardation film). Note that the slow axis refers to a direction providing a maximum in-plane refractive index, and the fast axis refers to a direction perpendicular to the slow axis in the same plane. Re[450] and Re[650] respectively represent to in-plane retardation values measured by using light of wavelengths of 450 nm and 650 nm at 23° C.

In one embodiment of the present invention, the retardation film has Re [550] of preferably 20 nm to 400 nm, and more preferably 80 nm to 350 nm. In a case where the retardation film is used as λ/4 plate, the retardation film has Re[550] of preferably 100 nm to 180 nm, more preferably 110 nm to 170 nm, particularly preferably 120 nm to 160 nm, and most preferably 130 nm to 150 nm. In a case where the retardation film is used as a λ/2 plate, the retardation film has Re[550] of preferably 220 to 300 nm, more preferably 230 nm to 290 nm, particularly preferably 240 nm to 280 nm, and most preferably 250 nm to 270 nm. Re[550] within the above ranges can increase a contrast ratio in an oblique direction of a liquid crystal display apparatus. Re[550] maybe controlled by adjusting a stretch ratio or a stretching temperature in stretching of a polymer film to be used.

In general, retardation values of an optical element (or a retardation film) may vary depending on wavelength. This property is referred to as wavelength dispersion property of the retardation film. The retardation film of the present invention has property of providing smaller retardation values with shorter wavelength (also referred to as reverse wavelength dispersion property) and satisfies an expression of Re[450]<Re[550]<Re[650]. In the specification of the present invention, the wavelength dispersion property can be determined from a ratio Re[450]/Re[550] between in-plane retardation values measured by using light of wavelengths of 450 nm and 550 nm at 23° C.

The retardation film of the present invention has Re[450]/Re[550] of less than 1, preferably 0.70 to 0.99, more preferably 0.76 to 0.92, particularly preferably 0.80 to 0.88, and most preferably 0.82 to 0.86. Re[450]/Re[550] within the above ranges can provide uniform retardation values in a broad visible light region. As a result, light in a wide range of wavelength evenly leaks from a liquid crystal display apparatus employing the retardation film, and a color shift in an oblique direction of the liquid crystal display apparatus can be further reduced. In particular, the liquid crystal display apparatus employing the retardation film has reduced light leak in a blue color region, and blue coloring of a display image can be prevented. Re[450]/Re[550] may be adjusted by the kinds of substituents or molar ratio of structural units of the resin described below, for example. The retardation film of the present invention has Re[550]/Re[650] of less than 1, preferably 0.76 to 0.99, more preferably 0.80 to 0.98, particularly preferably 0.84 to 0.97, and most preferably 0.92 to 0.95. Re[550]/Re[650] within the above ranges can provide uniform retardation values in a broad visible light region. As a result, light in a wide range of wavelength evenly leaks from a liquid crystal display apparatus employing the retardation film, and a color shift in an oblique direction of the liquid crystal display apparatus can be further reduced. In particular, the liquid crystal display apparatus employing the retardation film has reduced light leak in a red color region, and red coloring of a display image can be prevented. Re[550]/Re[650] may also be adjusted by the kinds of substituents or molar ratio of structural units of the resin described below, for example.

In the specification of the present invention, Rth[550] refers to a thickness direction retardation value measured by using light of a wavelength of 550 nm at 23° C. Rth[550] can be determined from an expression of Rth[550]=(nx−nz)×d (wherein, nx and nz respectively represent refractive indices of the retardation film in a slow axis direction and a thickness direction at a wavelength of 550 nm, and d (nm) represents a thickness of the retardation film). Note that the slow axis refers to a direction providing a maximum in-plane refractive index.

Rth[550] of the retardation film to be used in the present invention satisfies an expression of Rth[550]<Re[550]. Rth [550] satisfying the expression provides an appropriate retardation value in an oblique direction, to thereby increase a contrast ratio in an oblique direction of a liquid crystal display apparatus. Rth[550] is selected appropriately in accordance with an Nz coefficient (described below) of the retardation film. In an embodiment of the present invention, Rth[550] is preferably 10 nm to 200 nm, and more preferably 40 nm to 175 nm. In another embodiment of the present invention, Rth[550] is preferably 5 nm to 100 nm, and more preferably 20 nm to 90 nm. Instill another embodiment of the present invention, Rth[550] is preferably 15 nm to 300 nm, and more preferably 60 nm to 270 nm. For example, in a case where the retardation film of the present invention is used as a λ/4 plate with an Nz coefficient of 0.5, Rth[550] of the retardation film is preferably 50 nm to 90 nm, more preferably 55 nm to 85 nm, particularly preferably 60 nm to 80 nm, and most preferably 65 nm to 75 nm. For example, in a case where the retardation film of the present invention is used as a λ/2 plate with an Nz coefficient of 0.5, Rth[550] of the retardation film is preferably 110 nm to 150 nm, more preferably 115 nm to 145 nm, particularly preferably 120 nm to 140 nm, and most preferably 125 nm to 135 nm. Rth[550] may be controlled by: appropriately adjusting a stretch ratio or a stretching temperature in stretching of a polymer film to be used; or appropriately adjusting a shrinkage ratio of a shrinkable film described below.

The retardation film of the present invention has Rth[450]/Rth[550] of less than 1, preferably 0.70 to 0.99, more preferably 0.76 to 0.92, particularly preferably 0.80 to 0.88, and most preferably 0.82 to 0.86. Rth[450]/Rth[550] within the above ranges can provide uniform retardation values in a broad visible light region. As a result, light in a wide range of wavelength evenly leaks from a liquid crystal display apparatus employing the retardation film, and a color shift in an oblique direction of the liquid crystal display apparatus can be further reduced. In particular, the liquid crystal display apparatus employing the retardation film has reduced light leak in a blue color region, and blue coloring of a display image can be prevented. The retardation film of the present invention has also Rth[550]/Rth[650] of less than 1, preferably 0.76 to 0.99, more preferably 0.80 to 0.98, particularly preferably 0.84 to 0.97, and most preferably 0.92 to 0.95. Rth[550]/Rth[650] within the above ranges can provide uniform retardation values in a broad visible light region. As a result, light in a wide range of wavelength evenly leaks from a liquid crystal display apparatus employing the retardation film, and a color shift in an oblique direction of the liquid crystal display apparatus can be further reduced. In particular, the liquid crystal display apparatus employing the retardation film has reduced light leak in a red color region, and red coloring of a display image can be prevented.

Re[550] and Rth[550] can be determined by using a spectroscopic ellipsometer "M-220" (tradename, manufactured by JASCO Corporation) Refractive indices nx, ny, and nz can be determined by: using an in-plane retardation value (Re) and a retardation value (R40) measured by tilting a slow axis by 40° as a tilt angle at a wavelength of 550 nm and 23° C., a thickness (d) of an optical element (or a retardation film), and an average refractive index (n0) of the optical element (or a retardation film); and using the following expressions (i) to (iii) for computational numerical calculation. Then, Rth can be calculated from the following expression (iv). Here, $\Phi$ and ny' are represented by the following respective expressions (v) and (vi).

$$Re = (nx - ny) \times d \quad \text{(i)}$$

$$R40 = (nx - ny') \times d / \cos(\Phi) \quad \text{(ii)}$$

$$(nx + ny + nz)/3 = n0 \quad \text{(iii)}$$

$$Rth = (nx - nz) \times d \quad \text{(iv)}$$

$$\Phi = \sin^{-1}[\sin(40°)/n0] \quad \text{(v)}$$

$$ny' = ny \times nz / [ny^2 \times \sin^2(\Phi) + nz^2 \times \cos^2(\Phi)]^{1/2} \quad \text{(vi)}$$

In the specification of the present invention, Rth[550]/Re[550] is referred to as a ratio (also referred to as an Nz coefficient) between a thickness direction retardation value and an in-plane retardation value measured by using light of a wavelength of 550 nm at 23° C.

As described above, the retardation film of the present invention satisfies the expression of Rth[550]<Re[550] and thus has an Nz coefficient of less than 1. The retardation film of the present invention has an Nz coefficient of preferably more than 0 and less than 1. That is, the retardation film of the present invention preferably satisfies an expression of 0 nm <Rth[550]<Re[550]. The retardation film of the present invention has an Nz coefficient of more preferably 0.2 to 0.8, particularly preferably 0.3 to 0.7, and most preferably 0.4 to 0.6. An Nz coefficient within the above ranges allows appropriate adjustment of a retardation value in an oblique direction (reduces angle dependence of retardation value, for example), to thereby increase a contrast ratio in an oblique direction of a liquid crystal display apparatus.

The retardation film has a light transmittance of preferably 80% or more, more preferably 85% or more, and particularly preferably 90% or more measured by using light of a wavelength of 550 nm at 23° C.

The retardation film has an absolute value of photoelastic coefficient (C[550]((m$^2$/N)) of 50×10$^{-12}$ or less measured by using light of a wavelength of 550 nm at 23° C. Such an absolute value of photoelastic coefficient prevents shift or unevenness in retardation values of the retardation film due to shrinkage stress of a polarizer or heat of backlight of a liquid crystal panel, to thereby provide a liquid crystal display apparatus having favorable display uniformity. The retardation film has C[550] of preferably 1×10$^{-12}$ to 40×10$^{-12}$, particularly preferably 3×10$^{-12}$ to 30×10$^{-12}$, and most preferably 5×10$^{-12}$ to 25×10$^{-12}$. C[550] within the above ranges can provide desired retardation values and reduces shift or unevenness in retardation values of the retardation film.

A-3. Polymer Film to be Used for Retardation Film

A stretched film of a polymer film containing as a main component a thermoplastic resin is used as the retardation film of the present invention. In the specification of the present invention, the term "stretched film" refers to a plastic film having enhanced alignment of molecules in a specific direction obtained by: applying tension to an unstretched film at an appropriate temperature; or applying additional tension to a film stretched in advance.

The thermoplastic resin is not specifically limited. For example, one having excellent transparency, stretching property, orientation property, mechanical strength, and moisture screen may be used. Examples of the thermoplastic resin include: general purpose plastics such as polyethylene, polypropylene, polynorbornene, polyvinyl chloride, a cellulose ester, polystyrene, an ABS resin, an AS resin, polymethylmethacrylate, polyvinyl acetate, and polyvinylidene chloride; general purpose engineering plastics such as polyamide, polyacetal, polyvinyl acetal, polycarbonate, modified polyphenylene ether, polybutylene terephthalate, and polyethylene terephthalate; and super engineering plastics such as polyphenylene sulfide, polysulfone, polyethersulfone, polyetheretherketone, polyarylate, a liquid crystal polymer, polyamideimide, polyimide, and polytetrafluoroethylene. The thermoplastic resins may be used independently or in combination. The thermoplastic resin may be used after appropriate polymer modification. Examples of the polymer modification include copolymerization, crosslinking, and modifications in molecular terminals and stereoregularity.

The polymer film containing as a main component a thermoplastic resin has a glass transition temperature (Tg) of preferably 90° C. to 185° C., more preferably 90° C. to 150° C., particularly preferably 100° C. to 140° C., and most preferably 110° C. to 130° C. The glass transition temperature (Tg) can be determined through a DSC method in accordance with JIS K7121(:1987).

The polymer film containing a thermoplastic resin as a main component has a water absorption of preferably 0.01% to 5%, more preferably 0.05% to 4%, particularly preferably 0.1% to 3%, and most preferably 0.2% to 2%. A water absorption within the above ranges can provide a retardation film having favorable stability of retardation values. The water absorption of the retardation film can be determined through a method in accordance with JIS K7209 (:2000) The water absorption of the retardation film is adjusted appropriately by the kinds of substituents of a resin to be used in the present invention or the presence or absence (or a remaining amount) of hydroxyl groups.

Any appropriate forming method may be employed as a method of obtaining a polymer film containing a thermoplastic resin as a main component. Examples of the forming method include compression molding, transfer molding, injection molding, extrusion, blow molding, powder molding, FRP molding, and solvent casting, for example. Of those, extrusion or solvent casting is particularly preferred because a highly smooth retardation film with favorable optical uniformity (uniform in-plane and thickness direction retardation values, for example) can be obtained. To be specific, the extrusion involves: melting a resin composition containing as a main component a resin, a plasticizer, an additive, and the like under heating; extruding the molten resin composition into a thin film on a surface of a substrate (also referred to as a support) such as a casting roll by using a T-die or the like; and cooling the whole to produce a film. To be specific, the solvent casting involves: defoaming a rich solution (dope) prepared by dissolving in a solvent a resin composition containing as a main component a resin, a plasticizer, an additive, and the like; uniformly casting the defoamed solution into a thin film on a surface of a substrate (also referred to as a support) such as an endless stainless steel belt, a rotating drum, or a polymer film (such as a PET film); and evaporating the solvent to produce a film.

The conditions used for forming a polymer film may be selected appropriately in accordance with the composition or kind of the resin, or the forming method. The conditions for obtaining a polymer film having favorable optical uniformity through extrusion include, for example: a resin temperature of 170° C. to 250° C.; and a take-up roll (cooling drum) temperature of 50° C. to 100° C., and slow cooling from high temperatures is preferred. In solvent casting, examples of a solvent to be used include toluene, ethyl acetate, dichloromethane, tetrahydrofuran, dimethylsulfoxide, N,N-dimethylacetamide, N,N-dimethylformamide, N,N-methylpyrrolidone, cyclopentanone, cyclohexanone, and methyl isobutyl ketone. A drying temperature of the solvent is preferably 50° C. to 180° C., and more preferably 80° C. to 150° C., and the solvent is preferably dried by heating slowly from low temperatures.

The polymer film containing a thermoplastic resin as a main component may further contain any appropriate additive. Specific examples of the additive include a plasticizer, a thermal stabilizer, a light stabilizer, a lubricant, an antioxidant, a UV absorber, a flame retardant, a colorant, an antistatic agent, a compatibilizing agent, a crosslinking agent, a thickener, and a retardation value adjusting agent. The kind and amount of the additive to be used may be set appropriately depending on the purpose. For example, a content of the additive is preferably 0.01 (weight ratio) to 10 (weight ratio), more preferably 0.05 (weight ratio) to 8 (weight ratio), and most preferably 0.1 (weight ratio) to 5 (weight ratio) with respect to a total solid content of the polymer film as 100.

The retardation film of the present invention is preferably a stretched film of a polymer film containing as a main component a polyacetal-based resin having a chemical structure represented by the following general formula (I). The polyacetal-based resin can be obtained through a condensation reaction (also referred to as acetalization) by using a polymer resin having a hydroxyl group on a main chain or a side chain, and an aldehyde, for example. In the specification of the present invention, the polyacetal-based resin includes a reaction product (also referred to as a ketal) obtained through acetalization by using a ketone, which is a carbonyl compound similarly to the aldehyde. The chemical structure represented by the following general formula (I) is derived from an aldehyde or a ketone.

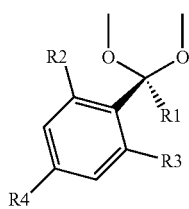

(I)

In the general formula (I): R1 represents a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group having 1 to 4 carbon atoms, a nitro group, an amino group, a hydroxyl group, a cyano group, or a thiol group; and R2 and R3 are not hydrogen atoms simultaneously.

In the general formula (I), the substituents R2, R3, and R4 are used for controlling conformation of a benzene ring to which the substituents are bonded. To be specific, in a stretched polymer film containing as a main component a polyvinyl acetal-based resin having a chemical structure represented by the general formula (I), the substituents may be easily conformed between two oxygen atoms in the general formula (I) owing to steric hindrance. As a result, a planar structure of the benzene ring may be aligned substantially perpendicular to a virtual line connecting two oxygen atoms.

The wavelength dispersion property of the retardation film of the present invention is presumably obtained owing to interaction between wavelength dispersion property of the benzene ring aligned substantially perpendicular to the virtual line connecting two oxygen atoms and wavelength dispersion property of a main chain structure.

R1, R2, R3, and R4 in the general formula (I) may each be selected appropriately in accordance with the kind of aldehyde (typically, benzaldehydes) or ketone (typically, acetophenones or benzophenones) to react with a hydroxyl group on a main chain or a side chain of a polymer resin for obtaining the polyacetal-based resin. An aldehyde may be used for substitution of a hydrogen atom into R1, and a ketone may be used for substitution of a substituent except the hydrogen atom into R1.

Specific examples of benzaldehydes include: 2-methylbenzaldehyde; 2-chlorobenzaldehyde; 2-nitrobenzaldehyde; 2-ethoxybenzaldehyde; 2-(trifluoromethyl)benzaldehyde; 2,4-dichlorobenzaldehyde; 2,4-dihydroxybenzaldehyde; sodium 2,4-disulfobenzaldehyde; disodium o-sulfobenzaldehyde; p-dimethylaminobenzaldehyde; 2,6-dimethylbenzaldhyde; 2,6-dichlorobenzaldehyde; 2,6-dimethoxybenzaldehyde; 2,4,6-trimethylbenzaldehyde (mesitaldehyde); 2,4,6-triethylbenzaldehyde; and 2,4,6-trichlorobenzaldehyde. Specific examples of acetophenones include: 2-methylacetophenone; 2-aminoacetophenone; 2-chloroacetophenone; 2-nitroacetophenone; 2-hydroxyacetophenone; 2,4-dimethylacetophenone; 4'-phenoxy-2,2-dichloroacetophenone; and 2-bromo-4'-chloroacetophenone. Examples of benzophenones include: 2-methylbenzophenone; 2-aminobenzophenone; 2-hydroxybenzophenone; 4-nitrobenzophenone; 2,4'-dichlorobenzophenone; 2,4'-dihydroxybenzophenone; 4,4'-dichlorobenzophenone; 4,4'-dihydroxybenzophenone; 2-hydroxy-4-methoxybenzophenone; and 2-chloro-4'-dichlorobenzophenone. Further examples of aldehyde and ketone include: 1-naphthaldehyde; 2-naphthaldehyde having a substituent; 9-anthraldehyde; 9-anthraldehyde having a substituent; acetonaphthone; fluorene-9-aldehyde; and 2,4,7-trinitrofluoren-9-one. The aldehyde or the ketone may be used alone or in combination. The aldehyde or the ketone may be subjected to appropriate modification for use.

R1 in the general formula (I) represents preferably a hydrogen atom or a methyl group, and more preferably a hydrogen atom. R2 and R3 in the general formula (II) each independently represent preferably a methyl group, an ethyl group, a halogen atom, or a halogenated alkyl group, and more preferably a methyl group. R4 in the general formula (I) represents preferably a hydrogen atom, a methyl group, an ethyl group, a halogen group, or a halogenated alkyl group, and more preferably a methyl group. Such substituents are introduced, to thereby provide a retardation film having excellent optical properties.

The retardation film of the present invention is more preferably a stretched film of a polymer film containing as a main component a polyvinyl acetal-based resin having a chemical structure represented by the following general formula (II). The polyvinyl acetal-based resin can be obtained through a condensation reaction (also referred to as acetalization) by using a polyvinyl alcohol-based resin, and an aldehyde or a ketone, for example. A polymer film containing as a main component a polyvinyl acetal-based resin having a chemical structure represented by the following general formula (II) is stretched appropriately, to thereby provide a retardation film exhibiting reverse wavelength dispersion property and having excellent formability and stretchability.

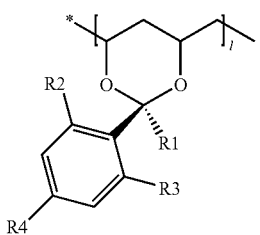

(II)

In the general formula (II): R1 represents a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3 and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group having 1 to 4 carbon atoms, a nitro group, an amino group, a hydroxyl group, a cyano group, or a thiol group; R2 and R3 are not hydrogen atoms simultaneously; and l represents an integer of 1 or more.

The acetalization includes a reaction between a polyvinyl alcohol-based resin, and an aldehyde or a ketone in the presence of a strong inorganic acid catalyst or a strong organic acid catalyst. Specific examples of an acid catalyst include hydrochloric acid, sulfuric acid, phosphoric acid, and p-toluenesulfonic acid. A reaction temperature in acetalization is typically higher than 0° C. and a boiling point of a solvent to be used or lower, preferably 10° C. to 100° C., and more preferably 20° C. to 80° C. A reaction temperature within the above ranges can provide a polyvinyl acetal-based resin at high yield. Specific examples of the solvent to be used in acetalization include: alcohols such as methanol, ethanol, propanol, and butanol; cyclic ethers such as 4-dioxane; and aprotic solvents such as N,N-dimethylformamide, N-methylpyrrolidone, and dimethylsulfoxide. The solvent may be used alone or in combination. Further, water and the above-mentioned solvent may be mixed for use.

The polyvinyl alcohol-based resin to be used as a raw material of the polyvinyl acetal-based resin maybe obtained by, for example: saponifying a vinyl ester-based polymer obtained through polymerization of a vinyl ester-based monomer; and converting vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate. Of those, vinyl acetate is preferred.

An appropriate average degree of polymerization may be employed as an average degree of polymerization of the polyvinyl alcohol-based resin to be used as a raw material of the polyvinyl acetal-based resin. The average degree of polymerization of the polyvinyl alcohol-based resin is preferably 800 to 3,600, more preferably 1,000 to 3,200, and most preferably 1,500 to 3,000. The average degree of polymerization of the polyvinyl alcohol-based resin can be determined through a method in accordance with JIS K6726 (:1994).

A degree of acetalization of the polyvinyl acetal-based resin to be used for the retardation film of the present invention is preferably 40 mol % to 99 mol %, more preferably 50 mol % to 95 mol %, and most preferably 60 mol % to 90 mol %. A degree of acetalization within the above ranges can provide a retardation film having excellent optical properties, formability, stretchability, and stability of retardation values.

The degree of acetalization refers to a ratio of vinyl alcohol units actually acetalized to vinyl alcohol units which may be converted into acetal units through acetalization. The degree of acetalization of the polyvinyl alcohol-based resin can be determined from a nuclear magnetic resonance spectrum ($^1$H-NMR).

The retardation film of the present invention is particularly preferably a stretched film of a polymer film containing as a main component a polyvinyl acetal-based resin having a chemical structure represented by the following general formula (III). The polyvinyl acetal-based resin can be obtained through a condensation reaction (also referred to as acetalization) by using a polyvinyl alcohol-based resin, and two or more kinds of aldehydes and two or more kinds of ketones, or at least one kind of aldehyde and at least one kind of ketone. A polymer film containing as a main component a polyvinyl acetal-based resin having a chemical structure represented by the following general formula (III) is stretched appropriately, to thereby provide a retardation film exhibiting reverse wavelength dispersion property and having excellent formability, stretchability, and stability of retardation values. Further, the retardation film has excellent orientation property by being stretched, and thus may have a reduced thickness.

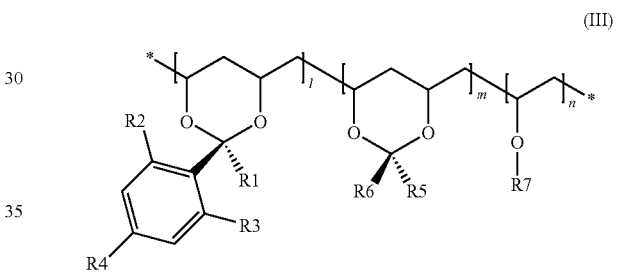

(III)

In the general formula (III): R1, R5, and R6 each independently represent a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group, a nitro group, an amino group, a hydroxyl group, a cyano group, or a thiol group; R2 and R3 are not hydrogen atoms simultaneously; R7 represents a hydrogen atom, a straight, branched, or cyclic alkyl group having 1 to 8 carbon atoms, a benzyl group, a silyl group, a phosphoric group, an acyl group, a benzoyl group, or a sulfonyl group; and l, m, and n each represent an integer of 1 or more.

In the general formula (III), substituents R5 and R6 are used for finely controlling the wavelength dispersion property of the retardation film obtained by stretching a polymer film containing as a main component a polyacetal-based resin having a chemical structure represented by the general formula (III). To be specific, the substituents R5 and R6 are introduced, to thereby align the substituents substantially parallel to a stretching direction of the polymer film. The wavelength dispersion property of the retardation film of the present invention is presumably obtained from interaction between the wavelength dispersion property of the benzene ring aligned substantially perpendicular to the virtual line connecting two oxygen atoms, and the wavelength dispersion property of the main chain structure described above, and the wavelength dispersion property of the substituents R5 and R6. Further, the substituents R5 and R6 are introduced to thereby further improve the formability, stretchability, stability of retardation values, and orientation property by being stretched of the polymer film.

R5 and R6 may each be selected appropriately in accordance with the kind of aldehyde (typically, benzaldehydes) or ketone (typically, acetophenones or benzophenons) to react with a hydroxyl group of the polyvinyl alcohol-based resin for obtaining the polyacetal-based resin, for example. Specific examples of aldehyde and ketone are the same as those described above.

R5 represents preferably a hydrogen atom or a methyl group, and more preferably a hydrogen atom. R6 represents preferably a methyl group or an ethyl group, and more preferably an ethyl group. Such substituents are introduced, to thereby provide a retardation film having extremely excellent formability, stretchability, stability of retardation values, and orientation property by being stretched.

In the general formula (III), a substituent R7 is used for protection (end cap treatment) of remaining hydroxyl groups, to thereby adjust a water absorption to an appropriate value and enhance solubility of the resin in a solvent, formability, and stability of retardation values. Thus, the position of R7 may not be subjected to the end cap treatment depending on the water absorption or optical properties of the obtained retardation film, and the use of the retardation film (that is, R7 may represent a hydrogen atom).

R7 represents any appropriate group (typically, a protective group) which may form a substituent (that is, which may be subjected to the end cap treatment) by reacting with a hydroxyl group of a polyvinyl acetal-based resin having hydroxyl groups remained. Specific examples of the protective group include: a benzyl group; a 4-methoxyphenylmethyl group; a methoxymethyl group; a trimethylsilyl group; a triethylsilyl group; a t-butyldimethylsilyl group; an acetyl group; a benzoyl group; a methanesulfonyl group; and bis-4-nitrophenylphosphite. Any appropriate reaction conditions may be employed for the end cap treatment in accordance with the kind of substituent to react with a hydroxyl group. For example, reactions such as alkylation, benzylation, silylation, phosphorylation, and sulfonylations each involve stirring a polyvinyl acetal-based resin having hydroxyl groups remained and a chloride of a target substituent in the presence of a catalyst such as 4-(N,N-dimethylamino)pyridine at 25° C. to 100° C. for 1 hour to 20 hours. R7 represents preferably a trimethylsilyl group, a triethylsilyl group, or a t-butylmethylsilyl group. Such a substituent is used, to thereby provide a retardation film having high transparency and excellent stability of retardation values even in an environment of high temperature and high humidity or the like.

In the general formula (III), a ratio among l, m, and n may be selected appropriately in accordance with the kinds of substituents and the purpose. Preferably, l is 5 to 30 (mol %), m is 20 to 80 (mol %), and n is 1 to 70 (mol %) with respect to the total of l, m, and n as 100 (mol %). Particularly preferably, l is 10 to 28 (mol %), m is 30 to 75 (mol %), and n is 1 to 50 (mol %) with respect to the total of l, m, and n as 100 (mol %). Most preferably, l is 15 to 25 (mol %), m is 40 to 70 (mol %), and n is 10 to 40 (mol %) with respect to the total of l, m, and n as 100 (mol %). A ratio among l, m, and n within the above ranges can provide a retardation film exhibiting reverse wavelength dispersion property and having extremely excellent formability, stretchability, stability or retardation values, and orientation property by being stretched.

A-4. Method of Producing Retardation Film

The retardation film of the present invention can be obtained by, for example: attaching shrinkable films on both sides of a polymer film containing as a main component a thermoplastic resin; and heat stretching the whole through a longitudinal uniaxial stretching method by using a roll stretching machine. The shrinkable film is used for providing shrinkage force in a direction perpendicular to a stretching direction during heat stretching, and for increasing a refractive index (nz) in a thickness direction. A method of attaching the shrinkable films to both sides of the polymer film is not particularly limited. However, a preferred method thereof involves providing an acrylic pressure sensitive adhesive layer containing as a base polymer an acrylic polymer between the polymer film and each of the shrinkable films to bond the polymer film and the shrinkable film from the viewpoints of excellent workability and economical efficiency.

An example of a method of producing the retardation film of the present invention will be described with reference to FIG. 1. FIG. 1 is a schematic view showing a concept of a typical production process of the retardation film of the present invention. For example, a polymer film 302 is delivered from a first delivery part 301. Shrinkable films 304 and 306 each provided with a pressure sensitive adhesive layer are attached to both sides of the polymer film 302 by laminate rollers 307 and 308, respectively. The shrinkable film 304 is delivered from a second delivery part 303, and the shrinkable film 306 is delivered from a third delivery part 305. The polymer film having the shrinkable films attached to both sides is subjected to stretching treatment while being maintained at a constant temperature by temperature control means 309 under tension in a longitudinal direction of the film by rollers 310, 311, 312, and 313 at different speed ratios (under tension in a thickness direction by shrinkage of the shrinkable films at the same time). The shrinkable films 304 and 306 each provided with a pressure sensitive adhesive layer are taken-up at a first take-up part 314 and a second take-up part 316, and a retardation film 318 of the present invention is taken-up at a third take-up part 319.

The shrinkable film preferably has a shrinkage ratio in a longitudinal direction of the film S(MD) of 2.7% to 9.4%, and a shrinkage ratio in a width direction of the film S(TD) of 4.6% to 15.8% at 140° C. The shrinkable film preferably has a difference $\Delta S = S(TD) - S(MD)$ between the shrinkage ratio in a width direction and the shrinkage ratio in a longitudinal direction of 3.2% to 9.6%. Shrinkage ratios and a difference between the shrinkage ratios within the above ranges can provide a retardation values having excellent optical uniformity and satisfying the optical properties described in the above-mentioned section A-1.

The shrinkage ratios S(MD) and S(TD) can be determined in accordance with a heat shrinkage ratio A method described in JIS Z1712(:1997) (except that: a heating temperature is changed from 120° C. to 140° C.; and a load of 3 g is added to a sample piece). To be specific, five samples each having a width of 20 mm and a length of 150 mm are sampled from a longitudinal direction (machine direction MD) and a width direction (transverse direction TD). The sample pieces are each marked at two position with a distance of about 100 mm at a center. The sample pieces each with a load of 3 g are hung vertically in an air-circulating thermostatic bath maintained at 140° C.±3° C. The sample pieces are heated for 15 min, taken out of the thermostatic bath, and left standing under standard conditions (room temperature) for 30 min. Then, the distances between marks are measured by using a caliper in accordance with JIS B7507, to thereby obtain an average of five measured values. A shrinkage ratio can be calculated from an expression S(%)=[((distance between marks (mm) before heating)−(distance between marks (mm) after heating))/(distance between marks (mm) before heating)]×100.

The shrinkable film is preferably a stretched film such as a biaxially stretched film or a uniaxially stretched film. The shrinkable film can be obtained by: forming a sheet-like unstretched film through an extrusion method; and stretching the unstretched film in a machine and/or transverse direction at a predetermined stretch ratio by using a simultaneous biaxial stretching machine or the like, for example. The forming and stretching conditions are selected appropriately in accordance with the composition or kind of the resin to be used and the purpose.

Examples of a material forming the shrinkable film include polyester, polystyrene, polyethylene, polypropylene, polyvinyl chloride, and polyvinylidene chloride. In particular, a biaxially stretched polypropylene film is preferably used as a shrinkable film in the present invention from the viewpoints of excellent mechanical strength, thermal stability, surface uniformity, and the like.

A commercially available shrinkable film used for applications such as general packaging, food packaging, pallet wrapping, shrinkable labels, cap seals, and electrical insulation can be selected appropriately and used as the above-described shrinkable film as long as the purpose of the present invention can be satisfied. The commercially available shrinkable film may be used as it is, or may be used after the shrinkable film is subjected to fabrication such as stretching treatment or shrinking treatment. Specific examples of the commercially available shrinkable film include: "ALPHAN series" (trade name, available from Oji paper Co., Ltd.); "FANCYTOP series" (tradename, available from Gunze Ltd.); "TORAYFAN series" (trade name, available from Toray Industries, Inc.); "SUN•TOX-OP series" (trade name, available from SUN•TOX Co., Ltd.); and "TOHCELLO OP series" (trade name, available from TOHCELLO Co., Ltd.).

A temperature inside the temperature control means (also referred to as stretching temperature) during heat stretching of a laminate of the polymer film containing as a main component a thermoplastic resin, and the shrinkable film may be selected appropriately in accordance with the intended retardation values, the kind, thickness, or the like of the polymer film to be used. The stretching temperature is preferably Tg+1° C. to Tg+30° C. (where, Tg represents a glass transition temperature of the polymer film) because retardation values easily even out and the film hardly crystallizes (becomes clouded) within the above-mentioned temperature range. More specifically, the stretching temperature is preferably 90° C. to 170° C., more preferably 100° C. to 160° C., and most preferably 110° C. to 150° C. The glass transition temperature (Tg) can be determined through a method in accordance with JIS K7121(:1987) by DSC measurement.

The temperature control means is not particularly limited, and specific examples thereof include: an air-circulating thermostatic oven in which hot air or cool air circulates; a heater using microwaves or far infrared rays; and any appropriate heating method or temperature control method employing a heated roller, heat pipe roller, metallic belt for temperature adjustment, or the like.

A stretching ratio (stretch ratio) during stretching of a laminate of the polymer film containing as a main component a thermoplastic resin, and the shrinkable film may be selected appropriately in accordance with the intended retardation values, the kind, thickness, or the like of the polymer film to be used. To be specific, the stretch ratio is preferably 1.1 times to 2.5 times, and more preferably 1.2 times to 2.0 times. A delivery speed during stretching is not particularly limited, but is preferably 0.5 m/min to 30 m/min, and more preferably 1 m/min to 20 m/min in consideration of the machine accuracy, stability, and the like of the stretching machine. The above-mentioned stretching conditions can provide a retardation film not only satisfying the intended optical properties but also having excellent optical uniformity.

B. Polarizing Element

B-1. Overview of Polarizing Element

Figure 2A:
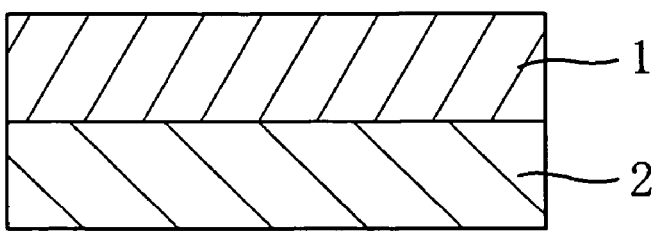
FIGS. 2A to 2C are each a schematic sectional view illustrating typical preferred embodiment of a polarizing element according to the present invention.
Figure 2B:
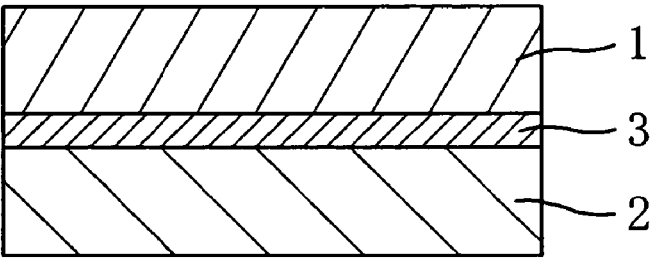
Figure 2C:
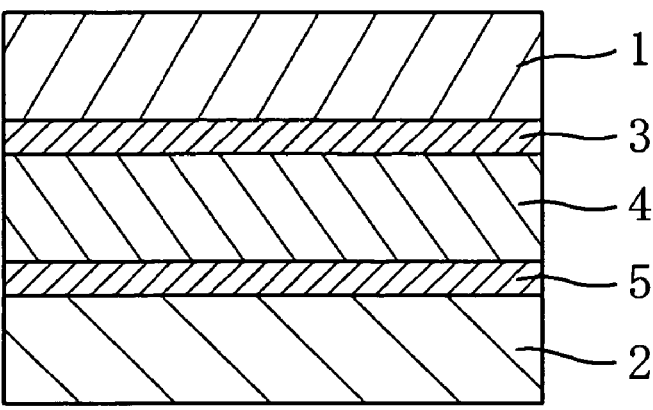

FIGS. 2A to 2C are each a schematic sectional view illustrating a typical preferred embodiment of a polarizing element according to the present invention. Note that a ratio among length, width, and thickness of each member in FIGS. 2A to 2C is different from that of an actual member for clarity. A polarizing element 10 is provided with a polarizer 1 and a retardation film 2. In actual use, the polarizing element may include any appropriate protective layer on an outer side (side without the retardation film 2) of the polarizer 1. FIG. 2A shows an embodiment in which the polarizing element 10 is provided with the retardation film 2 on one side of the polarizer 1 (through no adhesive layer). In such embodiment, the retardation film also serves as a protective layer on one side of the polarizer, to thereby contribute in reduction in thickness of the polarizing element. A polarizing element according to such embodiment may be produced by: introducing an organic solvent between the polarizer and the retardation film by utilizing a capillary phenomenon, for example; and allowing the polarizer and the retardation film to adhere to each other with the solvent. FIG. 2B shows an embodiment in which the polarizing element 10 is provided with the retardation film 2 on one side of the polarizer 1 through an adhesive layer 3. In such embodiment, the retardation film also serves as a protective layer on one side of the polarizer, to thereby contribute in reduction in thickness of the polarizing element. Further, such embodiment may provide a polarizing element including the polarizer and retardation film hardly peeled from each other even in a high temperature and high humidity environment. FIG. 2C shows an embodiment in which the polarizing element 10 is provided with: a protective layer 4 on one side of the polarizer 1 through the adhesive layer 3; and the retardation film 2 on one side (side opposite to the polarizer 1) of the protective layer 4 through an adhesive layer 5. Such embodiment may provide a polarizing element including the polarizer and retardation film hardly peeled from each other even in a high temperature and high humidity environment. Further, such embodiment may provide a polarizing element hardly causing shift or unevenness in retardation values of the retardation film due to shrinkage stress of the polarizer. The polarizing element of the present invention is not limited to those described in the above-mentioned embodiments, and other members may be arranged between the members shown in FIGS. 2A to 2C. Hereinafter, detailed description will be given of members of the polarizing element of the present invention.

B-2. Polarizer

In the specification of the present invention, a polarizer refers to an optical film capable of converting natural light or polarized light into appropriate polarized light. Any appropriate polarizer may be employed as a polarizer used for a polarizing plate of the present invention. Preferably, a film capable of converting natural light or polarized light into linearly polarized light is used.

The polarizer may have any appropriate thickness. The thickness of the polarizer is typically 5 μm to 80 μm, preferably 10 µm to 50 µm, and more preferably 20 µm to 40 µm. A thickness of the polarizer within the above ranges can provide excellent optical properties and mechanical strength.

A light transmittance (single axis transmittance) of the polarizer measured by using light of a wavelength of 440 nm at 23° C. is preferably 41% or more, and more preferably 43% or more. A theoretical upper limit of the single axis transmittance is 50%. A degree of polarization is preferably 99.8% to 100%, and more preferably 99.9% to 100%. A light transmittance and a degree of polarization within the above ranges can further increase a contrast ratio in a normal direction of a liquid crystal display apparatus employing the polarizing element of the present invention.

The single axis transmittance and the degree of polarization can be determined by using a spectrophotometer "DOT-3" (trade name, manufactured by Murakami Color Research Laboratory) The degree of polarization can be determined by: measuring a parallel light transmittance ($H_0$) and a perpendicular light transmittance ($H_{90}$) of the polarizer; and using the following equation. Degree of polarization (%)=$\{(H_0-H_{90})/(H_0+H_{90})\}^{1/2} \times 100$. The parallel light transmittance ($H_0$) refers to a transmittance of a parallel laminate polarizer produced by piling two identical polarizers such that respective absorption axes are parallel to each other. The perpendicular light transmittance ($H_{90}$) refers to a transmittance of a perpendicular laminate polarizer produced by piling two identical polarizers such that respective absorption axes are perpendicular to each other. The light transmittance refers to a Y value obtained through color correction by a two-degree field of view (C source) in accordance with JIS Z8701-1982.

The polarizer described above is preferably formed of a stretched film of a polymer film containing as a main component a polyvinyl alcohol-based resin, which contains a dichromatic substance. The polymer film containing as a main component a polyvinyl alcohol-based resin is produced for example through a method described in [Example 1] of JP 2000-315144 A, which is herein incorporated by reference.

The polyvinyl alcohol-based resin to be used may be prepared by: polymerizing a vinyl ester-based monomer to obtain a vinyl ester-based polymer; and saponifying the vinyl ester-based polymer to convert vinyl ester units into vinyl alcohol units. Examples of the vinyl ester-based monomer include vinyl formate, vinyl acetate, vinyl propionate, vinyl valerate, vinyl laurate, vinyl stearate, vinylbenzoate, vinylpivalate, and vinylversatate. Of those, vinyl acetate is preferred.

The polyvinyl alcohol-based resin may have any appropriate average degree of polymerization. The average degree of polymerization is preferably 1,200 to 3,600, more preferably 1,600 to 3,200, and most preferably 1,800 to 3,000. The average degree of polymerization of the polyvinyl alcohol-based resin can be determined through a method in accordance with JIS K6726-1994.

A degree of saponification of the polyvinyl alcohol-based resin is preferably 90.0 mol % to 99.9 mol %, more preferably 95.0 mol % to 99.9 mol %, and most preferably 98.0 mol % to 99.9 mol % from the viewpoint of durability of the polarizer.

The degree of saponification refers to a ratio of units actually saponified into vinyl ester units to units which may be converted into vinyl ester units through saponification. The degree of saponification of the polyvinyl alcohol-based resin may be determined in accordance with JIS K6726-1994.

The polymer film containing as a main component a polyvinyl alcohol-based resin to be used as the polarizer may preferably contain polyvalent alcohol as a plasticizer. Examples of the polyvalent alcohol include ethylene glycol, glycerin, propylene glycol, diethylene glycol, triethylene glycol, tetraethylene glycol, and trimethylolpropane. The polyvalent alcohol may be used independently or in combination. In the present invention, ethylene glycol or glycerin is preferably used from the viewpoints of stretchability, transparency, thermal stability, and the like.

A use amount of the polyvalent alcohol in the present invention is preferably 1 to 30 (weight ratio), more preferably 3 to 25 (weight ratio), and most preferably 5 to 20 (weight ratio) with respect to a total solid content in the polyvinyl alcohol-based resin as 100. A use amount of the polyvalent alcohol within the above ranges can further enhance coloring property or stretchability.

Any appropriate dichromatic substance may be employed as the dichromatic substance. Specific examples thereof include iodine and a dichromatic dye. In the specification of the present invention, the term "dichromatic" refers to optical anisotropy in which light absorption differs in two directions of an optical axis direction and a direction perpendicular thereto.

Examples of the dichromatic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

Figure 3:
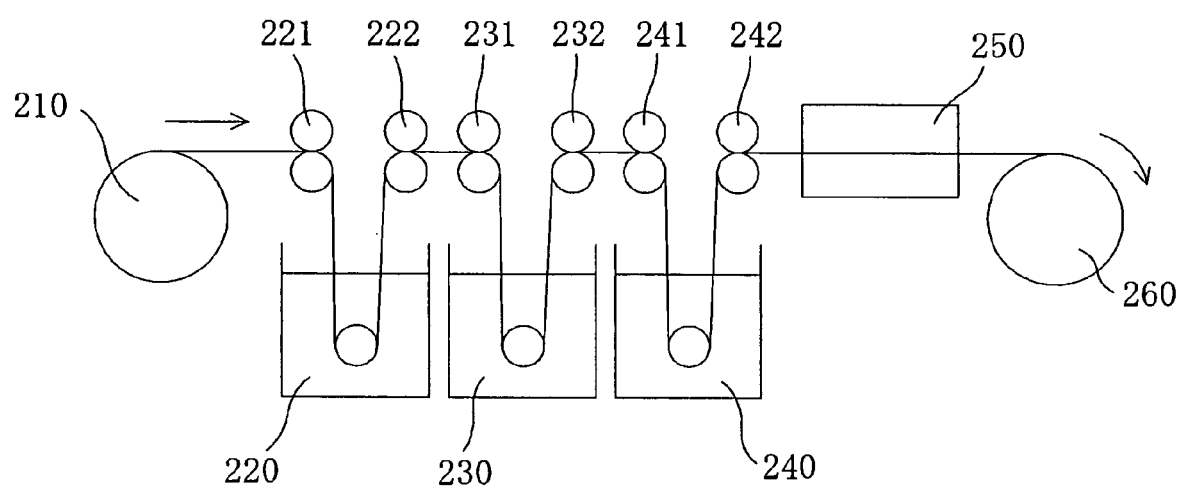
FIG. 3 is a schematic view showing a concept of a typical production process of a polarizer used in the present invention.

An example of a method of producing a polarizer will be described by referring to FIG. 3. FIG. 3 is a schematic diagram showing a concept of a typical production process of a polarizer used in the present invention. For example, a polymer film 201 containing as a main component a polyvinyl alcohol-based resin is fed from a feed roller 200, immersed in an aqueous iodine solution bath 210, and subjected to swelling and coloring treatment under tension in a longitudinal direction of the film by rollers 211 and 212 at different speed ratios. Next, the film is immersed in a bath 220 of an aqueous solution containing boric acid and potassium iodide, and subjected to crosslinking treatment under tension in a longitudinal direction of the film by rollers 221 and 222 at different speed ratios. The film subjected to crosslinking treatment is immersed in a bath 230 of an aqueous solution containing potassium iodide by rollers 231 and 232, and subjected to water washing treatment. The film subjected to water washing treatment is dried by drying means 240 to adjust its moisture content, and taken up in a take-up part 260. The polymer film containing as a main component a polyvinyl alcohol-based resin may be stretched to a 5 to 7 times length of the original length through the above process, to thereby provide a polarizer 250.

The polarizer may have any appropriate moisture content. More specifically, the moisture content is preferably 5% to 40%, more preferably 10% to 30%, and most preferably 20% to 30%.

In addition to the above-described polarizer, further examples of the polarizer to be used in the present invention include: a polarizer prepared by stretching a polymer film incorporating a dichromatic substance; an O-type polarizer of guest/host-type prepared by aligning in a specific direction a liquid crystal composition containing a dichromatic substance and a liquid crystal compound (U.S. Pat. No. 5,523,863); and an E-type polarizer prepared by aligning lyotropic liquid crystals in a specific direction (U.S. Pat. No. 6,049,428).

B-3. Adhesive Layer

Referring to FIGS. 2B and 2C, the adhesive layers 3 and 5 are each arranged between the polarizer 1 and the retardation film 2, between the polarizer 1 and the protective layer 4, or between the protective layer 4 and the retardation film 2, for bonding the members together. The adhesive layer is not particularly limited as long as it is used for bonding the members together, and examples thereof that may be used include an adhesive layer, a pressure sensitive adhesive layer, and an anchor coat layer.

Any appropriate adhesive may be employed for forming the adhesive layer, and the adhesive is preferably a material having excellent transparency, thermal stability, low birefringence, and the like. Specific examples thereof include an aqueous adhesive, a thermoplastic adhesive, a hot-melt adhesive, a rubber-based adhesive, a heat-curable adhesive, a monomer reaction-type adhesive, an inorganic adhesive, and natural adhesive. Preferred examples thereof from the viewpoints of excellent optical transparency, weatherability, and thermal resistance include: a monomer reaction-type adhesive containing as a main component aliphatic isocyanate "Takenate 631" (trade name, available from Mitsui Takeda Chemicals, Inc.); and an aqueous adhesive containing as a main component modified polyvinyl alcohol having an acetoacetyl group "GOHSEFIMER Z series" (trade name, available from Nippon Synthetic Chemical Industry Co., Ltd.). A thickness of the adhesive layer may be appropriately determined in accordance with the kind of a resin to serve as an adherend, the adhesive strength, the environment in which the adhesive is used, and the like. The adhesive layer has a thickness of preferably 0.01 μm to 50 μm, more preferably 0.05 μm to 20 μm, and most preferably 0.1 μm to 10 μm.

Any appropriate pressure sensitive adhesive may be employed for forming the pressure sensitive adhesive layer. It is preferably a material having excellent transparency, thermal stability, low birefringence, and the like. Specific examples of the pressure sensitive adhesive include a solvent-type pressure sensitive adhesive, a nonaqueous emulsion-type pressure sensitive adhesive, an aqueous pressure sensitive adhesive, a hot-melt pressure sensitive adhesive, a liquid curable pressure sensitive adhesive, a curable pressure sensitive adhesive, and a pressure sensitive adhesive used in calendering. The pressure sensitive adhesive preferably used is a solvent-type pressure sensitive adhesive (also referred to as acrylic pressure sensitive adhesive) containing as a base polymer an acrylic polymer from the viewpoints of excellent optical transparency, appropriate pressure sensitive adhesive properties such as wetting property, agglomeration property, and adhesiveness, and excellent weatherability and heat resistance. A specific example thereof is a double-face optical tape "SK-2057" (trade name, available from Soken Chemical & Engineering Co., Ltd.) containing as a pressure sensitive adhesive layer an acrylic pressure sensitive adhesive. Thickness of the pressure sensitive adhesive layer is preferably 1 μm to 100 μm, more preferably 5 μm to 80 μm, and most preferably 10 μm to 50 μm.

Any appropriate pressure sensitive adhesive may be employed as a material forming the anchor coat layer, and the pressure sensitive adhesive is preferably a material having excellent transparency, thermal stability, low birefringence, and the like. Specific example thereof include thermoplastic resin compositions each containing as a main component polyester, polyacryl, polyurethane, polyvinylidene chloride, or the like of the thermoplastic resin compositions, a thermoplastic resin composition containing polyester as a main component is preferably used as a material forming the anchor coat layer. A thermoplastic resin containing as a main component modified polyester obtained through copolymerization of polyurethane and polyester is more preferably used as a material forming the anchor coat layer. Such modified polyester is produced through a method described in paragraphs [0025] to [0032] of JP 08-122969 A, which is herein incorporated by reference. A specific example of the modified polyester is "VYLON UR series" (trade name, available from Toyobo Co., Ltd.).

An application method using any appropriate coater may be employed as a method of forming the adhesive layer. Specific examples of the coater include a reverse roll coater, a positive rotation roll coater, a gravure coater, a knife coater, a rod coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Of those, preferred examples of the coater used in the present invention include a reverse roll coater, a positive rotation roll coater, a gravure coater, a rod coater, a slot orifice coater, a curtain coater, a fountain coater, and a spin coater. An application method employing the above-mentioned coater can form a very thin adhesive layer having excellent surface uniformity and optical uniformity.

Any appropriate method may be employed as a method of laminating the adhesive layer on a surface of each member (such as a polarizer, a protective layer, or a retardation film). Specific examples thereof include hot melt lamination, non-solvent lamination, wet lamination, and dry lamination. The present invention preferably employs wet lamination in the case where an adhesive layer or an anchor layer is used as an adhesive layer, and the present invention preferably employs dry lamination in the case where a pressure sensitive adhesive layer is used as an adhesive layer.

B-4. Protective Layer

A material having excellent transparency, mechanical strength, thermal stability, water barrier property, and the like is preferably used as a material forming the protective layer. Specific examples thereof include a thermosetting resin, a UV-curable resin, a thermoplastic resin, a thermoplastic elastomer, and a biodegradable plastic. Of those, a thermoplastic resin is preferably used. The thermoplastic resin maybe a noncrystalline polymer or a crystalline polymer. The noncrystalline polymer has an advantage of exhibiting excellent transparency, and the crystalline polymer has advantages of exhibiting excellent rigidity, strength, and chemical resistance.

Examples of the thermoplastic resin include: general purpose plastics such as polyethylene, polypropylene, polynorbornene, polyvinyl chloride, a cellulose aceate, polystyrene, an ABS resin, an AS resin, polymethylmethacrylate, polyvinyl acetate, polyvinylidene chloride, and a resin from a raw material for a fiber; general purpose engineering plastics such as polyamide, polyacetal, polycarbonate, modified polyphenylene ether, polybutylene terephthalate, and polyethylene terephthalate; and super engineering plastics such as polyphenylene sulfide, polysulfone, polyethersulfone, polyetheretherketone, polyarylate, a liquid crystalline polymer, polyamideimide, and polytetrafluoroethylene. The thermoplastic resin may be used after appropriate polymer modification. Examples of the polymer modification include copolymerization, branching, crosslinking, and modifications in molecular terminals and stereoregularity. Note that: in the present invention, the protective layer is not limited to those described above.

A commercially available polymer film may be used as the protective layer. Examples thereof include: "FUJITAC"

(trade name, available from Fuji Photo Film Co., Ltd.); "ZEONOR" (trade name, available from Zeon Corporation); and "ARTON" (trade name, available from JSR Corporation). Further examples thereof include polymer films described in JP 2001-343529 A (WO01/37007) such as: a polymer film of a resin composition containing an alternating copolymer of isobutylene and N-methylmaleimide, and/or an acrylonitrile/styrene copolymer.

The protective layer may have any appropriate thickness. The protective layer has a thickness of generally 5 μm to 150 μm, preferably 10 μm to 120 μm, and more preferably 20 μm to 100 μm. A thickness within the above ranges can provide excellent optical properties and mechanical strength.

C. Liquid Crystal Panel

C-1. Overview of Liquid Crystal Panel

Figure 4A:
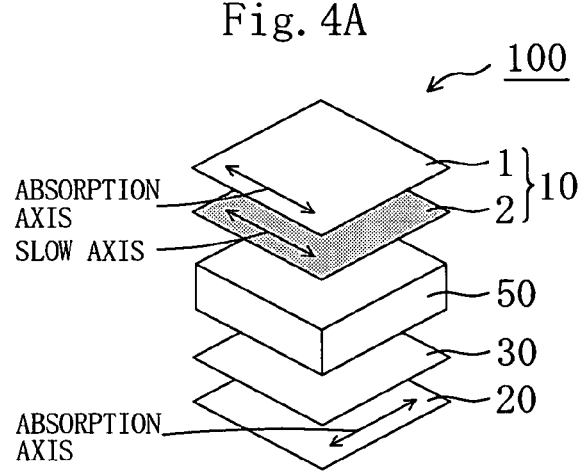
FIGS. 4A to 4D are each a schematic perspective view of a liquid crystal panel according to a typical preferred embodiment of the present invention.
Figure 4B:
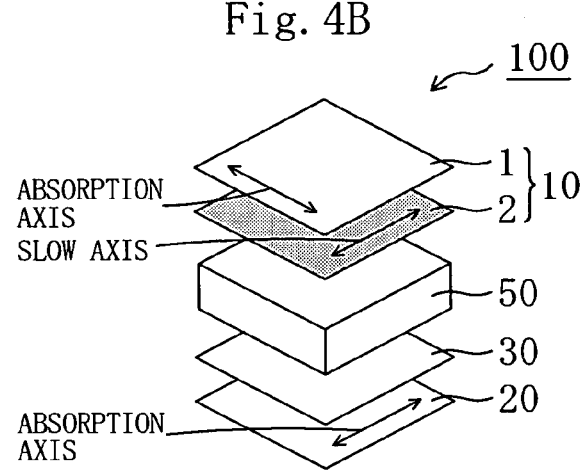
Figure 4C:
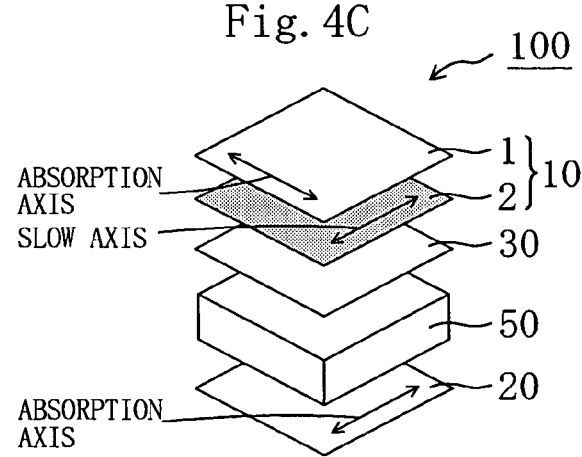
Figure 4D:
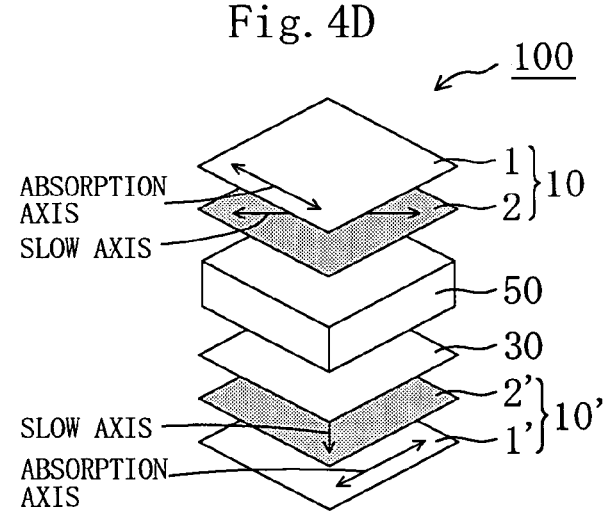

FIGS. 4A to 4D are each a schematic perspective view of a liquid crystal panel according to a preferred embodiment of the present invention. A liquid crystal panel 100 is provided with a liquid crystal cell 50 and the polarizing element 10 of the present invention. In each of FIGS. 4A and 4B, the liquid crystal panel 100 is provided with: the polarizing element 10 (laminate of the retardation film 2 and the polarizer 1) on one side of the liquid crystal cell 50; and an appropriate optical film 30 (typically, a protective layer or another retardation film) and a polarizer 20 on another side of the liquid crystal cell 50. FIG. 4A shows a case where a slow axis of the retardation film 2 is substantially parallel to an absorption axis of the polarizer 1, and FIG. 4B shows a case where the slow axis of the retardation film 2 is substantially perpendicular to the absorption axis of the polarizer 1. In FIG. 4C, the liquid crystal panel 100 is provided with: the polarizing element 10 (laminate of the retardation film 2 and the polarizer 1) and an appropriate optical film 30 (typically, a protective layer or another retardation film) on one side of the liquid crystal cell 50; and the polarizer 20 on another side of the liquid crystal cell 50. FIG. 4C shows a case where the slow axis of the retardation film 2 is substantially perpendicular to the absorption axis of the polarizer 1, but the slow axis of the retardation film 2 may be substantially parallel to the absorption axis of the polarizer 1. The embodiments shown in FIGS. 4A to 4C each allow reduction of light leak in an oblique direction of the liquid crystal panel and increase of a contrast ratio in an oblique direction of a liquid crystal display apparatus. In FIG. 4D, the liquid crystal panel 100 is provided with: polarizing elements 10 (10') on both sides of the liquid crystal cell 50; and an appropriate optical film 30 (typically, a protective layer or another retardation film) on one side of the liquid crystal cell 50. The retardation film 2 is arranged such that its slow axis is substantially 45° to absorption axes of polarizers 1 (1'). The embodiment shown in FIG. 4D allows use of circularly polarizing plates for the polarizing elements 10 (10').

In the specification of the present invention, the phrase "substantially parallel" includes a case where the slow axis of the retardation film 2 and the absorption axis of the polarizer 1 form an angle of 0°±2.0°, preferably 0°±1.0°, and more preferably 0°±0.5°. The phrase "substantially perpendicular" includes a case where the slow axis of the retardation film 2 and the absorption axis of the polarizer 1 form an angle of 90°±2.0°, preferably 90°±1.0°, and more preferably 90°±0.5°. The phrase "substantially 45°" includes a case where the slow axis of the retardation film 2 and the absorption axis of the polarizer 1 form an angle of 45°±2.0°, preferably 45°35 1.0°, and more preferably 45°±0.5°. An angle greatly departing from the above ranges tends to cause reduction in contrast ratio in a front and an oblique directions of the liquid crystal panel. Hereinafter, the constitution member of the liquid crystal panel of the present invention will be explained in detail.

C-2. Liquid Crystal Cell

The liquid crystal cell to be used for the liquid crystal panel of the present invention is provided with: a pair of substrates; and a liquid crystal layer as a display medium arranged between the pair of substrates. One substrate (active matrix substrate) is provided with: a switching element (typically TFT, not shown) for controlling electrooptic properties of liquid crystals; and a scanning line (not shown) for providing a gate signal to the switching element and a signal line (not shown) for providing a source signal thereto. The other substrate (color filter substrate) is provided with color filters. The color filters may be provided in the active matrix substrate as well. A distance (cell gap) between the pair of substrates is controlled by a spacer (not shown). An alignment film (not shown) formed of, for example, polyimide is provided on a side of each of the substrates in contact with the liquid crystal layer.

The liquid crystal layer preferably contains nematic liquid crystals aligned in at least one kind of molecular alignment selected from twisted alignment, homeotropic alignment, homogenous alignment, bend alignment, and hybrid alignment in the absence of an electric field. The twisted alignment refers to a state in which liquid crystal molecules are aligned substantially parallel to surfaces of both substrates and alignment direction is twisted by 90° between the substrates. A typical example of a drive mode employing nematic liquid crystals aligned in twisted alignment in the absence of an electric field is a twisted nematic (TN) mode. The homeotropic alignment refers to a state in which liquid crystal molecules are aligned substantially perpendicular to the surfaces of both substrates. A typical example of a drive mode employing nematic liquid crystals aligned in homeotropic alignment in the absence of an electric field is a vertical alignment (VA) mode. The homogeneous alignment refers to a state in which liquid crystal molecules are aligned substantially parallel to the surfaces of both substrates. Typical examples of a drive mode employing nematic liquid crystals aligned in homogenous alignment in the absence of an electric field include an in-plane switching (IPS) mode and a homogeneous ECB mode. The bend alignment refers to a state in which liquid crystal molecules are arranged substantially parallel to a surface of one substrate, and arranged at successively and continuously varying angles to be substantially perpendicular to the surface of the substrate toward a center of the liquid crystal layer and to be substantially parallel to a surface of another substrate away from the center of the liquid crystal layer. A typical example of a drive mode employing nematic liquid crystals aligned in bend alignment in the absence of an electric field is an optically compensated bend (OCB) mode. The hybrid alignment refers to a state in which liquid crystal molecules are aligned substantially perpendicular to a surface of one substrate and are aligned parallel to a surface of another substrate in one direction (thus, the alignment of the liquid crystal molecules is bent continuously at 90° between the two substrates). A typical example of a drive mode employing nematic liquid crystals aligned in hybrid alignment in the absence of an electric field is a hybrid alignment nematic (HAN) mode.

Any appropriate nematic liquid crystals may be employed as the nematic liquid crystals depending on the purpose. For example, the nematic liquid crystals may have positive dielectric anisotropy or negative dielectric anisotropy. The nematic liquid crystals having negative dielectric anisotropy is preferably used in the liquid crystal display apparatus of a VA mode. A specific example of the nematic liquid crystals having positive dielectric anisotropy includes "ZLI-4535" (trade name, available from Merck Ltd., Japan). A specific example of the nematic liquid crystals having negative dielectric anisotropy includes "ZLI-2806" (trade name, available from Merck Ltd., Japan). A difference between an ordinary index (no) and an extraordinary index (ne), that is, a birefringence ($\Delta n_{LC}$) can be appropriately selected in accordance with the response speed, transmittance, and the like of the liquid crystal cells. However, the birefringence is preferably 0.05 to 0.30, in general.

Any appropriate cell gap may be employed as the cell gap (distance between substrates) of the liquid crystal cell depending on the purpose. However, the cell gap is preferably 1.0 µm to 7.0 µm. A cell gap within the above range can reduce response time and provide favorable display properties.

C-3. Another Retardation Film

In the present invention, any appropriate retardation film may be employed in accordance with a drive mode of the liquid crystal cell (another retardation film may be omitted depending on the drive mode of the liquid crystal cell). Referring to FIGS. 4A to 4D, another retardation film 30 is arranged between the liquid crystal cell 50 and the polarizer 20, or between the liquid crystal cell 50 and the retardation film 2 (2'). Note that in each of FIGS. 4A to 4D, one retardation film 30 is arranged on one side of the liquid crystal cell 50. However, two retardation films 30 may be arranged on one side of the liquid crystal cell 50, or one or more retardation films may be arranged on each side of the liquid crystal cell. In the case where another two or more retardation films are used, the retardation films may be identical to or different from each other.

Figure 5:
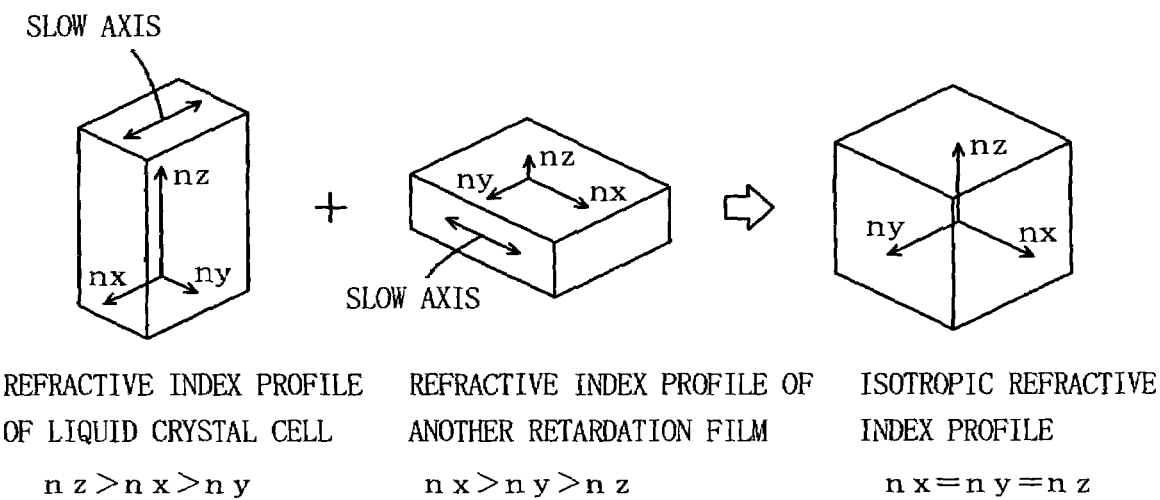
FIG. 5 is a typical schematic diagram explaining a method of canceling retardation values of a liquid crystal cell by using another retardation film.
Figure 6:
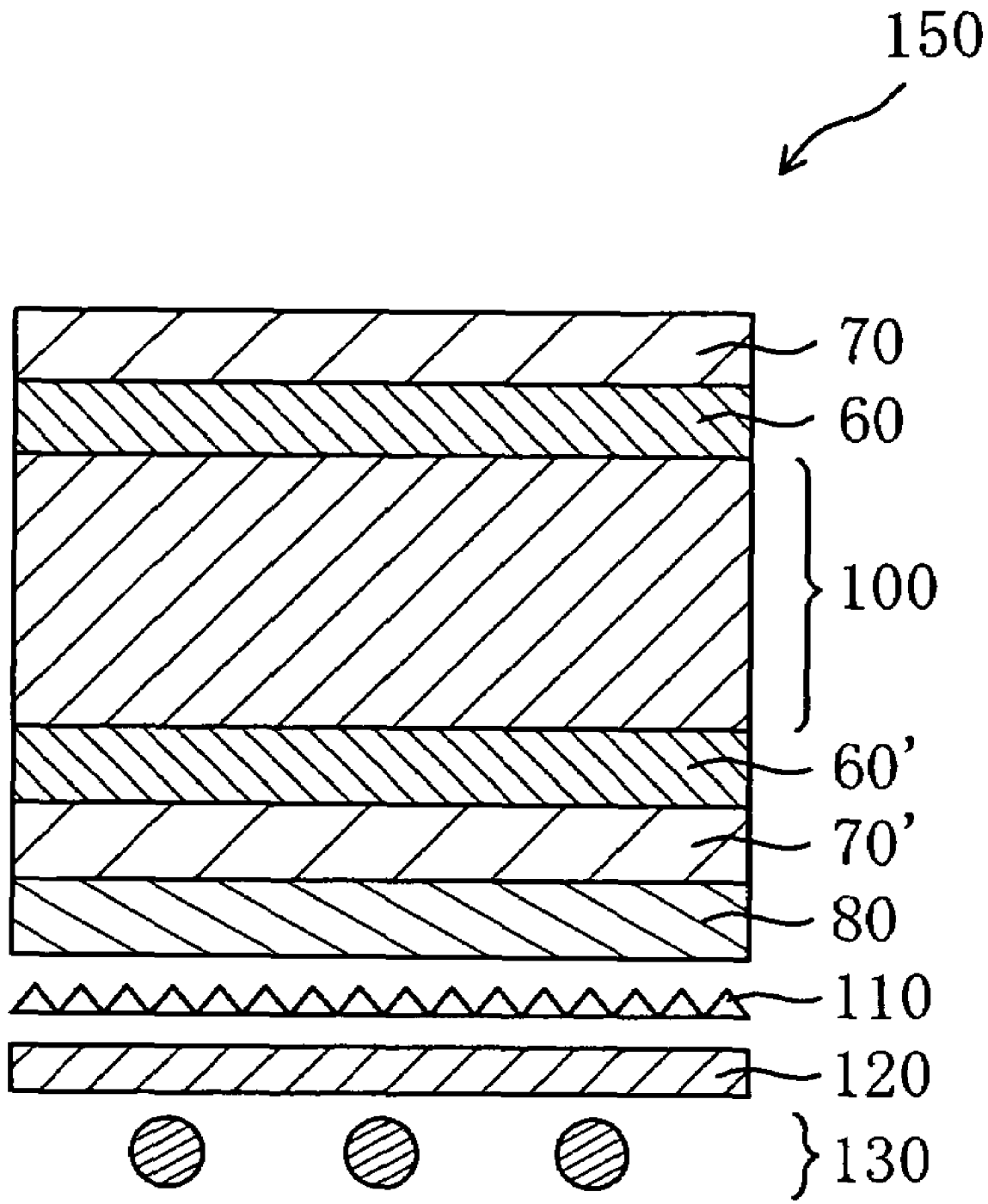
FIG. 6 is a schematic sectional view of a liquid crystal display apparatus according to a preferred embodiment of the present invention.

The retardation film 30 is preferably used for optically compensating and canceling retardation values of the liquid crystal cell 50. FIG. 5 is a typical schematic diagram explaining a concept of canceling retardation values of a liquid crystal cell by using another retardation film. In the specification of the present invention, the phrase "canceling retardation values of a liquid crystal cell" refers to optically compensating the retardation values such that a laminate of the liquid crystal cell and another retardation film has a substantially isotropic refractive index profile represented by a relationship of nx=ny=nz. As shown in FIG. 6, retardation values of a liquid crystal cell (typically, a liquid crystal cell with a drive mode of a TN mode, an OCB mode, or an HAN mode) having a refractive index profile represented by a relationship of nz>nx>ny can preferably be cancelled by arranging another retardation film having a refractive index profile represented by a relationship of nx>ny>nz such that the slow axes of the liquid crystal cell and other retardation film are perpendicular to each other, for example. For clarity, FIG. 6 shows only a case where the liquid crystal cell has a refractive index profile represented by a relationship of nz>nx>ny. However, the retardation values may obviously be cancelled for a liquid crystal cell having a refractive index profile represented by a relationship of nz>nx=ny, or a liquid crystal cell having a refractive index profile represented by a relationship of nx>ny=nz by using another retardation film having an appropriate refractive index profile, for example.

Any appropriate material maybe selected as a material forming another retardation film. A material having excellent transparency, mechanical strength, thermal stability, water barrier property, and the like is preferably used. Specific examples thereof include: a stretched film of a polymer film containing a thermoplastic resin as a main component; and an optical film prepared by aligning a liquid crystal compound in an appropriate alignment and fixing or curing the aligned liquid crystal compound. Note that another retardation film has appropriate retardation values in accordance with a refractive index profile (eventually, retardation values) of the liquid crystal cell.

C-4. Means of Arranging Each Member

Any appropriate method may be employed as a method of arranging each member (such as a retardation film, a polarizer, or a liquid crystal cell) depending on the purpose. Preferably, an adhesive layer (typically, an adhesive layer or a pressure sensitive adhesive layer) is provided between the members, and the opposing members are bonded together. A gap between the members is filled with the adhesive layer, to thereby prevent shift in relationship among optical axes of the respective members and damages of the members through abrasion by each other when the members are incorporated into a liquid crystal display apparatus. Further, interface reflection at a gap between the members may be reduced, and contrast ratios of a liquid crystal display apparatus employing the members in a normal direction and an oblique direction may be increased.

The adhesive layer may have the thickness in the same range as that described in the above-mentioned section B-2. The adhesive layer may be formed of the same material as that described in the above-mentioned section B-2.

D. Liquid Crystal Display Apparatus

The liquid crystal panel of the present invention may be used for: a liquid crystal display apparatus such as a personal computer, a liquid crystal television, a cellular phone, or a personal digital assistance (PDA); or an image display apparatus such as an organic electroluminescence display (organic EL), a projector, a projection television, or a plasma television. In particular, the liquid crystal panel of the present invention is preferably used for a liquid crystal display apparatus, and particularly preferably used for a liquid crystal television.

FIG. 6 is a schematic sectional view of a liquid crystal display apparatus according to a preferred embodiment of the present invention. A liquid crystal display apparatus 150 is provided with: a liquid crystal panel 100; protective layers 60 and 60' arranged on both sides of the liquid crystal panel 100; surface treated layers 70 and 70' arranged on outer sides of the protective layers 60 and 60'; and a brightness enhancement film 80, a prism sheet 110, a light guide plate 120, and a light source 130 all arranged on an outerside (backlight side) of the surface treated layer 70'. Treated layers subjected to the hard coat treatment, antireflection treatment, anti-sticking treatment, diffusion treatment (also referred to as anti-glare treatment), or the like is used as the surface treated layers 70 and 70'. A polarization separation film having a polarization selection layer "D-BEF series" (trade name, manufactured by Sumitomo 3M Limited, for example) or the like is used as the brightness enhancement film 80. The above-described optical members are used, to thereby obtain a display apparatus with better display properties. In another embodiment, the optical members shown in FIG. 6 may be partly omitted or replaced by other optical members in accordance with the drive mode or application of the liquid crystal cell as long as the effects of the present invention are obtained.

The present invention will be described in more detail with reference to examples and comparative examples. However, the present invention is not limited to those examples. Analysis methods in examples are descried below.

(1) Determination of Composition Ratio

A composition ratio was determined from peaks at 0.83 ppm, 0.95 to 2.0 ppm, 3.5 to 5.0 ppm, and 6.76 ppm by using a nuclear magnetic resonance spectrometer "LA400" (trade name, manufactured by JEOL Ltd., measurement solvent: DMSO-d solvent, frequency: 400 MHz, observation nucleus: $^1$H, measurement temperature: 25° C.)

(2) Measurement of Glass Transition Temperature

The glass transition temperature was measured by using a differential scanning calorimeter "DSC-6200" (trade name, manufactured by Seiko Instruments & Electronics Ltd.) through a method in accordance with JIS K7121(:1987) (Testing methods for transition temperatures of plastics). To be specific, 10 mg of a powder sample was heated (temperature increase rate of 10° C./min) under a nitrogen atmosphere (gas flow rate of 50 ml/min) for measurement twice, and the second data was employed as the glass transition temperature. The calorimeter was subjected to temperature correction by using a reference material (indium).

(3) Method of Measuring Thickness:

A thickness of less than 10 μm was measured by using a thin film thickness spectrophotometer "Multichannel photodetector (MCPD-2000)" (trade name, manufactured by Otsuka Electronics Co., Ltd.). A thickness of 10 μm or more was measured by using a digital micrometer "KC-351C-type" (trade name, manufactured by Anritsu Corporation).

(4) Method of Determining Retardation Values (Re, Rth):

The retardation values were determined by using a spectroscopic ellipsometer "M-220" (tradename, manufactured by JASCO Corporation) by using light of a wavelength of 550 nm at 23° C. Each light of wavelengths of 450 nm and 650 nm, was also used for wavelength dispersion measurement.

(5) Method of Measuring Average Refractive Index of Film:

The average refractive index of the film was determined by measuring refractive indices by using an Abbe refractometer "DR-M4" (trade name, manufactured by Atago Co., Ltd.) by using light of a wavelength of 589 nm at 23° C.

(6) Method of Measuring Transmittance:

The transmittance was measured by using a UV-vis spectrophotometer "V-560" (trade name, manufactured by JASCO Corporation) by using light of a wavelength of 550 nm at 23° C.

(7) Method of Measuring Photoelastic Coefficient:

The retardation values (23° C./wavelength of 550 nm) of a center portion of a sample having a size of 2 cm×10 cm were determined understress (5 to 15N) by using a spectroscopic ellipsometer "M-220" (trade name, manufactured by JASCO Corporation) while both ends of the sample were fixed, and the photoelastic coefficient was calculated from a slope of a function of the stress and the retardation values.

(8) Determination of Water Absorption

The water absorption was determined through a method in accordance with JIS K7209 (:2000) (Determination of water absorption and boiling water absorption of plastics). A test sample had a size of 50 mm×50 mm and a thickness of 40 μm to 100 μm.

(9) Method of Determining Contrast Ratio of Liquid Crystal Display Apparatus:

Measurement with the liquid crystal display in Example 4 (described later) was performed in a dark room at 23° C. after backlight was turned on for a predetermined period of time by using the following measurement apparatus and method. A white image and a black image were displayed on a liquid crystal display apparatus, and Y values of an XYZ display system in all azimuth directions (0° to 360°) in a direction at a polar angle of 78° of a display screen were measured by using "EZ Contrast 160D" (trade name, manufactured by ELDIM SA). A contrast ratio "YW/YB" in all azimuth directions was calculated from a Y value (YW) of the white image and a Y value (YB) of the black image, thereby illustrating a contour map with monochrome shading. Note that, the polar angle of 78° refers to a direction inclined by 78° with respect to a normal direction of the panel at 0°.

(10) Method of Determining Color Shift of Liquid Crystal Display Apparatus:

Measurement with the liquid crystal display in Example 4 (described later) was performed in a dark room at 23° C. after backlight was turned on for a predetermined period of timeby using the following measurement apparatus and method. To be specific, a black image was displayed on the liquid crystal display apparatus, and X values and Y values of an XYZ display system were measured in all azimuth directions (0° to 360°) in a direction at a polar angle of 78° by using "EZ Contrast 160D" (trade name, manufactured by ELDIM SA). The measured values were plotted on an XY chromaticity diagram.

REFERENCE EXAMPLE 1

Synthesis of Resin (i)

5.0 g of a polyvinyl alcohol-based resin "NH-18" (trade name, available from Nippon Synthetic Chemical Industry Co., Ltd., degree of polymerization: 1,800, degree of saponification: 99.0%) was dried at 105° C. for 2 hours and dissolved in 95 ml of dimethylsulfoxide (DMSO). 3.78 g of 2,4,6-trimethylbenzaldehyde (mesitaldehyde), 1.81 g of propionaldehyde, and 1.77 g of p-toluenesulfonic acid monohydrate were added to the solution, and the whole was stirred at 40° C. for 4 hours. The obtained reaction product was added dropwise into a water/ethanol solution (2/1 in v/v) containing 2.35 g of sodium bicarbonate for reprecipitation. A polymer obtained through filtration was dissolved in tetra hydrofuran, and the solution was added dropwise into diethylether for reprecipitation. The polymer obtained through filtration was dried, to thereby obtain 7.89 g of white polymer. $^1$H-NMR measurement confirmed that the white polymer was a polyvinyl acetal-based resin having a structure represented by the following formula (IV) (l:m:n=22:46:32). Differential scanning calorimetry confirmed that the white polymer had a glass transition temperature of 102° C.

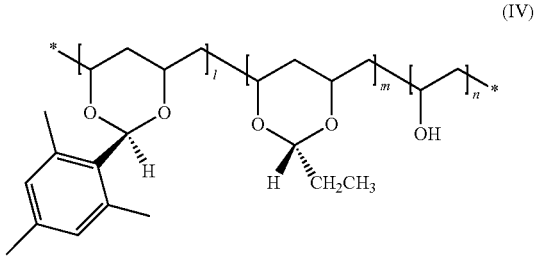

(IV)

REFERENCE EXAMPLE 2

Synthesis of Resin (ii)

5.0 g of a polyvinyl alcohol-based resin "NH-18" (trade name, available from Nippon Synthetic Chemical Industry Co., Ltd., degree of polymerization: 1,800, degree of saponification: 99.0%) was dried at 105° C. for 2 hours and dissolved in 95 ml of dimethylsulfoxide (DMSO). 2.02 g of 2,4,6-trimethylbenzaldehyde (mesitaldehyde) and 0.44 g of p-toluenesulfonic acid monohydrate were added to the solution, and the whole was stirred at 40° C. for 2 hours. 13.41 g of 1,1-diethoxyethane (acetal) was added thereto, and the whole was stirred at 40° C. for additional 2 hours. Then, 1.18 g of triethylamine was added thereto, to thereby complete the reaction. The obtained reaction product (polymer) was added dropwise into methanol for reprecipitation. After settling of the polymer, a supernatant was removed through decantation, and a methanol/water solution (1/1 in v/v) was added to the polymer, to thereby wash the polymer. The polymer obtained through filtration was dried, to thereby obtain 7.50 g of white polymer. $^1$H-NMR measurement confirmed that the white polymer was a polyvinyl acetal-based resin having a structure represented by the following formula (V) (l:m:n=21:58:21). Differential scanning calorimetry confirmed that the white polymer had a glass transition temperature of 120° C.

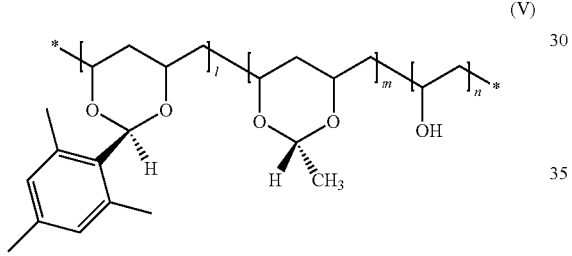

(V)

REFERENCE EXAMPLE 3

Production of Polymer Film (i)

17.7 parts by weight of the polyvinyl acetal-based resin (formula (V), l:m:n=21:58:21) obtained in Reference Example 2 was dissolved in 100 parts by weight of toluene, to thereby prepare a solution. The solution was applied uniformly onto a surface of a polyethylene terephthalate film "Lumirror S27-E" (trade name, available from Toray Industries, Inc., thickness of 75 μm) by using a comma coater. The whole was dried in a multi-chamber air-circulating drying oven (error of ±1° C.) with gradually increasing temperature from a low temperature of 80° C. for 20 min, 120° C. for 20 min, and 140° C. for 30 min, to thereby produce a polymer film having a thickness of 155 μm and a residual volatile content of 2% after drying. The polymer film had a transmittance of 90% and a water absorption of 3%.

REFERENCE EXAMPLE 4

Synthesis of Resin (iii)

A monomer A having a structure represented by the following formula (VI) and a monomer B having a structure represented by the following formula (VII) in a ratio A/B of 32/68 (mol/mol) were dissolved in an aqueous solution of sodium hydroxide, and a small amount of hydrosulfide was added thereto. Next, methylene chloride was added to the mixture, and phosgen was blown into the mixture at 20° C. for 60 min. p-Tert-butylphenol was added to the obtained reaction solution for emulsification. Then, triethylamine was added thereto, and the whole was stirred at 30° C. for 3 hours, to thereby complete the reaction. After completion of the reaction, an organic layer was separated from the reaction solution, and methylene chloride was evaporated, to thereby obtain an opaque white polymer. $^1$H-NMR measurement confirmed that the opaque white polymer was a polycarbonate-based resin having the substantially same composition ratio as that of the raw materials used. Differential scanning calorimetry confirmed that the opaque white polymer had a glass transition temperature of 227° C.

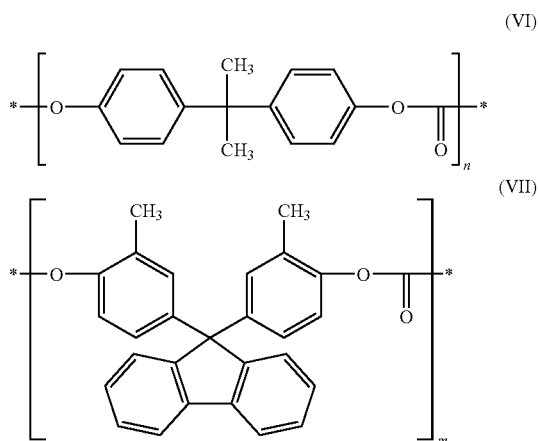

(VI)

(VII)

REFERENCE EXAMPLE 5

Production of Polymer Film (ii)

The polycarbonate-based resin (17.7 parts by weight) obtained in Reference Example 4 was dissolved in methylene chloride (100 parts by weight), to thereby prepare a solution. The solution was applied uniformly onto a surface of a polyethylene terephthalate film "Lumirror S27-E" (trade name, available from Toray Industries, Inc., thickness of 75 μm) by using a comma coater. The whole was dried in a multi-chamber air-circulating drying oven (error of ±1° C.) with gradually increasing temperature from a low temperature of 30° C. for 20 min, 60° C. for 20 min, and 130° C. for 30 min, to thereby produce a polymer film having a thickness of 80 μm and a residual volatile content of 1% after drying. The polymer film had a transmittance of 90%.

REFERENCE EXAMPLE 6

Production of Another Retardation Film

Polyimide (weight average molecular weight of 94,000, average refractive index of 1.57, Δnxz of 0.07) was synthesized through a conventional method by using 2,2'-dichloro-4,4',5,5'-biphenyltetracarboxylic dianhydride (40 mmol) and 2,2-bis(trifluoromethyl)-4,4'-diaminobiphenyl (40 mmol) as starting materials (monomers). This polyimide (17.7 parts by weight) was dissolved in methyl isobutyl ketone (100 parts by weight), to thereby prepare a solution. The solution was applied in one direction onto a surface of a triacetyl cellulose film "FUJITAC UZ" (trade name, available from Fuji Photo Film Co., Ltd.) by using a rod coater. The whole was dried in an air-circulating thermostatic oven at 135±1° C. for 5 min, and then in an air-circulating thermostatic oven at 150±1° C. for 10 min for evaporation of the solvent, to thereby produce a laminate having a triacetyl cellulose film layer and a polyimide layer (thickness of 3.1 μm) as a laminate retardation film X. The laminate retardation film X had Re[550] of 0.2 nm and Rth[550] of 290 nm.

REFERENCE EXAMPLE 7

Production of Polarizer

A polymer film "9P75R" (trade name, available from Kuraray Co., Ltd., thickness of 75 μm, average degree of polymerization of 2,400, degree of saponification of 99.9 mol %) containing polyvinyl alcohol as a main component was uniaxially stretched 2.5 times by using a roll stretching machine while the polymer film was colored in a coloring bath maintained at 30° C.±3° C. and containing iodine and potassium iodide. Next, the polymer film was uniaxially stretched to a 6 times length of the original length of the polyvinyl alcohol film in an aqueous solution maintained at 60° C.±3° C. and containing boric acid and potassium iodide while a crosslinking reaction was performed. The obtained film was dried in an air circulating thermostatic oven at 50° C.±1° C. for 30 min, to thereby obtain polarizers P1 and P2 each having a moisture content of 23%, a thickness of 28 μm, a degree of polarization of 99.9%, and a single axis transmittance of 43.5%.

REFERENCE EXAMPLE 8

Production of Liquid Crystal Cell of a VA Mode

A liquid crystal panel was taken out of a commercially available liquid crystal display apparatus "32-inch TH-32LX10" (manufactured by Matsushita Electric Industrial Co., Ltd.) including a liquid crystal cell of a VA mode (normally black mode). Members (pressure sensitive adhesive layers, polarizing plates, and retardation films) arranged above and below the liquid crystal cell were removed, and glass surfaces (front and back surfaces) of the liquid crystal cell were washed. The liquid crystal cell had Rth[550] of 320 nm without application of an electrical field.

EXAMPLE 1

Production of Retardation Film (i)

A biaxially stretched polypropylene film "TORAYFAN E60, high shrinkage-type" (trade name, available from Toray Industries, Inc., thickness of 60 μm) was attached to each side of a polymer film obtained in the same manner as in Reference Example 3 (thickness of 155 μm, average refractive index of 1.50, Re[550] of 2.0 nm, Rth[550] of 2.0 nm) through an acrylic pressure sensitive adhesive layer (thickness of 15 μm). Then, the resultant was stretched 1.5 times in an air-circulating drying oven at 141° C.±1° C. (temperature at a distance of 3 cm from a back surface of the film) by using a roll stretching machine while a longitudinal direction of the film was held, to thereby produce a retardation film A. Table 1 collectively shows properties of the obtained retardation film A and properties of retardation films of Example 2 and Comparative Example 1 described below. A part of the retardation film A was left standing in an air-circulating drying oven at 80° C.±1° C. for 100 hours, and measurement of the retardation film A confirmed that Re[550] changed within 2%, thereby indicating that the retardation film A had excellent stability of retardation values.

TABLE 1

|  | Example 1 | Example 2 | Comparative example 1 |
|---|---|---|---|
| Retardation film | A | B | C |
| Thickness (μm) | 160 | 91 | 78 |
| Glass transition temperature (° C.) | 120 | 120 | 227 |
| Transmittance (%) | 90 | 90 | 90 |
| Re[450](nm) | 227 | 115 | 112 |
| Re[550](nm) | 270 | 137 | 138 |
| Re[650](nm) | 286 | 145 | 143 |
| Re[450]/Re[550] | 0.84 | 0.84 | 0.81 |
| Re[550]/Re[650] | 0.94 | 0.94 | 0.96 |
| Rth[450](nm) | 114 | 58 | 111 |
| Rth[550](nm) | 135 | 68 | 137 |
| Rth[650](nm) | 143 | 73 | 142 |
| Rth[450]/Rth[550] | 0.84 | 0.85 | 0.81 |
| Rth[550]/Rth[650] | 0.94 | 0.93 | 0.96 |
| Nz coefficient | 0.5 | 0.5 | 1.0 |
| C[590] × $10^{-12}$ (m$^2$/N) | 21 | 21 | 57 |

The biaxially stretched polypropylene film used in Example 1 had a shrinkage ratio of 6.4% in an MD direction and a shrinkage ratio of 12.8% in a TD direction at 140° C. The acrylic pressure sensitive adhesive used in Example 1 was prepared by: using as a base polymer isononyl acrylate (weight average molecular weight of 550,000) synthesized through solution polymerization; and mixing 3 parts by weight of a crosslinking agent "CORONATE L" (trade name, available from Nippon Polyurethane Industry Co., Ltd.) of a polyisocyanate compound and 10 parts by weight of a catalyst "OL-1" (trade name, available from Tokyo Fine Chemical Co., Ltd.) with respect to 100 parts by weight of the base polymer.

EXAMPLE 2

Production of Retardation Film (ii)

A retardation film B was produced in the same manner as in Example 1 except that: the thickness of the polymer film before stretching was changed to 90 μm; the stretching temperature was changed from 141° C. to 138° C.; and the stretch ratio was changed from 1.5 times to 1.6 times. Table 1 shows the properties of the obtained retardation film B.

COMPARATIVE EXAMPLE 1

Production of Retardation Film (iii)

A biaxially stretched polypropylene film "TORAYFAN E60, high shrinkage-type" (trade name, available from Toray Industries, Inc., thickness of 60 μm) was attached to each side of a polymer film obtained in the same manner as in Reference Example 5 (thickness of 80 μm, average refractive index of 1.55, Re[550] of 2.0nm, Rth[550] of 5.0 nm) through an acrylic pressure sensitive adhesive layer (thickness of 15 μm). Then, the resultant was stretched 1.2 times in an air-circulating drying oven at 220° C.±1° C. (temperature at a distance of 3 cm from a back surface of the film) by using a roll stretching machine while a longitudinal direction of the film was held, to thereby produce a retardation film C. Table 1 shows the properties of the obtained retardation film C.

EXAMPLE 3

Production of Polarizing Element (i)

The retardation film A obtained in Example 1 was laminated on one side of the polarizer P1 obtained in Reference Example 7 through an adhesive layer "GOHSEFIMER Z200" (trade name, available from Nippon Synthetic Chemical Industry Co., Ltd., thickness of 1 μm) containing as a main component modified polyvinyl alcohol having an acetoacetyl group such that a slow axis of the retardation film A was parallel (0°±0.5°) to an absorption axis of the polarizer P1, to thereby obtain a polarizing element A.

REFERENCE EXAMPLE 9

Production of Polarizing Element (ii)

The laminate retardation film X obtained in Reference Example 6 was laminated on one side of the polarizer P2 obtained in Reference Example 7 through an adhesive layer "GOHSEFIMER Z200" (trade name, available from Nippon Synthetic Chemical Industry Co., Ltd., thickness of 1 μm) containing as a main component modified polyvinyl alcohol having an acetoacetyl group such that a slow axis of the laminate retardation film X was parallel (0°±0.5°) to an absorption axis of the polarizer P2, to thereby obtain a polarizing element B.

EXAMPLE 4

Production of Liquid Crystal Panel and Liquid Crystal Display Apparatus

The polarizing element A obtained in Example 3 was laminated on a surface of a viewer side of the liquid crystal cell obtained in Reference Example 8 through an acrylic pressure sensitive adhesive layer (thickness of 20 μm) such that: the retardation film A was arranged between the polarizer P1 and the liquid crystal cell; and a longer side of the liquid crystal cell and the absorption axis of the polarizer P1 were parallel to each other. Next, the polarizing element B obtained in Reference Example 9 was laminated on a backlight side of the liquid crystal cell through an acrylic pressure sensitive adhesive layer (thickness of 20 μm) such that: the laminate retardation film X was arranged between the polarizer P2 and the liquid crystal cell; and a shorter side of the liquid crystal cell and the absorption axis of the polarizer P2 were parallel to each other.

Figure 7:
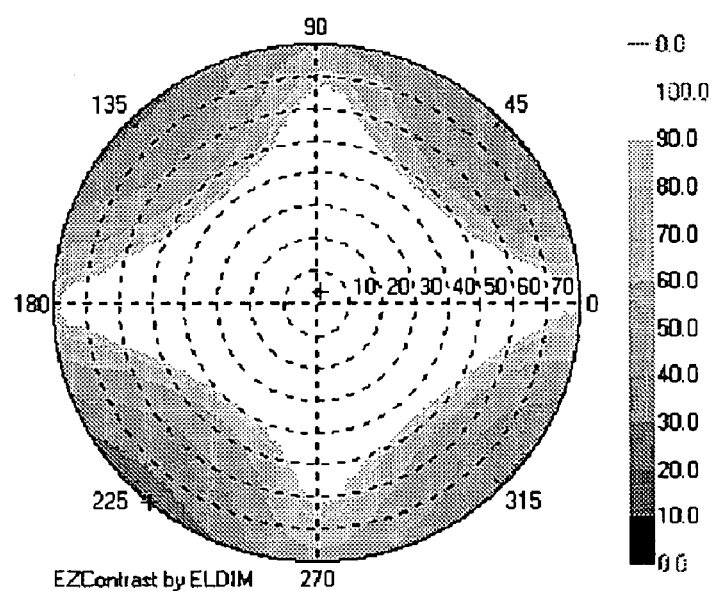
FIG. 7 is a contour map of a contrast ratio in an oblique direction of a liquid crystal display apparatus obtained in Example 4.
Figure 8:
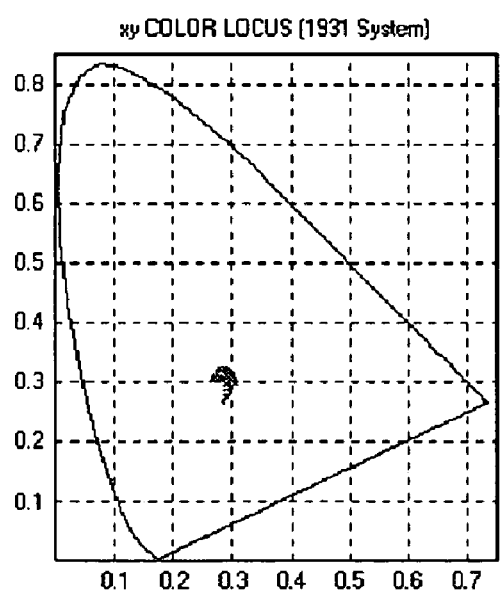
FIG. 8 is an xy chromaticity diagram in an oblique direction of a liquid crystal display apparatus obtained in Example 4.

The thus-obtained liquid crystal panel A was connected to a backlight unit, to thereby produce a liquid crystal display apparatus A. The liquid crystal panel had favorable display uniformity across the entire surface just after backlight was turned on. Then, backlight was turned on for 10 min, to thereby measure a contrast ratio in an oblique direction and a color shift in an oblique direction. FIG. 7 shows a contour map of a contrast ratio in an oblique direction of the obtained liquid crystal display apparatus, and FIG. 8 shows an xy chromaticity diagram. FIG. 7 shows that a white displayed part having a contrast ratio of 90 or more (a part having a very high contrast ratio) spreads widely in all azimuth directions (especially in vertical and horizontal directions) of a display screen, and an average contrast ratio in an oblique direction was 44.7 (maximum contrast ratio: 55.3, minimum contrast ratio: 30.9) at a polar angle of 78° and an azimuth angle of 360°. FIG. 8 shows that the measured (X, Y) values for the respective azimuth directions were concentrated in a very narrow area of an XY chromaticity diagram, and therefore that a color shift in an oblique direction was small. Backlight was turned on for additional 3 hours, and the display screen was visually observed. As a result, no display unevenness was observed, and the liquid crystal display apparatus A had favorable display uniformity.

[Evaluation]

As shown in Examples 1 to 4, the retardation film having an absolute value of photoelastic coefficient ($m^2/N$) of $50 \times 10^{-12}$ or less measured by using light of a wavelength of 550 nm at 23° C. and satisfying both relationships of Re[450]<Re[550]<Re[650] and Rth[550]<Re[550] was actually produced by: attaching a shrinkable film having a predetermined shrinkage ratio to each side of a polymer film containing as a main component polyvinyl acetal having a specific structure; and heat stretching the whole. The liquid crystal display apparatus incorporating the retardation film of the present invention exhibited favorable display properties (high contrast ratio and small color shift) and had favorable display uniformity even after backlight was turned on for a long period of time. In contrast, the retardation film of Comparative Example 1 satisfied the relationship of Re[450]<Re[550]<Re[650] but had a large absolute value of photoelastic coefficient. Further, retardation film of Comparative Example 1 was obtained through the same stretching method as those of Examples, however, it did not satisfy the relationship of Rth[550]<Re[550].

As described above, the retardation film of the present invention has a small absolute value of photoelastic coefficient and exhibits reverse wavelength dispersion property, and thus is very useful for improving display properties of the liquid crystal display apparatus. Therefore, the liquid crystal panel of the present invention may suitably be used for a liquid crystal display apparatus or a liquid crystal television.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A retardation film comprising a stretched film of a polymer film having an absolute value of photoelastic coefficient ($m^2/N$) of $50 \times 10^{-12}$ or less measured by using light of a wavelength of 550 nm at 23° C., which satisfies the following expressions (1) and (2):

$$Re[450] < Re[550] < Re[650] \quad (1)$$

$$Rth[550] < Re[550] \quad (2)$$

in the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.; and which has an Nz coefficient of 0.2 to 0.8;

wherein the Nz coefficient is a ratio of Rth[550]/Re[550] between the thickness direction retardation value and the in-plane retardation value measured by using light of a wavelength of 550 nm at 23° C.

2. A retardation film according to claim 1, which has a thickness of 20 μm to 200 μm.

3. A retardation film according to claim 1, which has Re[550] of 20 nm to 400 nm.

4. A retardation film according to claim 1, which has Re[450]/Re[550] of 0.70 to 0.99.

5. A retardation film according to claim 1, which has Rth of 10 nm to 200 nm.

6. A retardation film according to claim 1, wherein the polymer film has a glass transition temperature (Tg) of 90° C. to 185° C.

7. A retardation film according to claim 1, wherein the polymer film contains as a main component a polyacetal-based resin having a chemical structure represented by the following general formula (I):

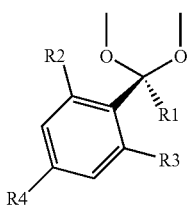

(I)

in the general formula (I): R1 represents a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group, a nitro group, an amino group, a hydroxyl group, a cyano group, or a thiol group; and R2 and R3 are not hydrogen atoms simultaneously.

8. A retardation film according to claim 7, wherein the polymer film contains as a main component a polyvinyl acetal-based resin having a chemical structure represented by the following general formula (II):

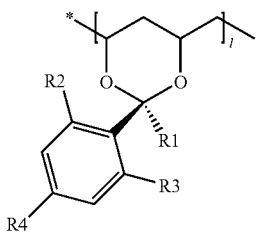

(II)

in the general formula (II):R1 represents a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group, a nitro group, an amino group, a hydroxyl group, a cyano group, or a thiol group; R2 and R3 are not hydrogen atoms simultaneously; and l represents an integer of 1 or more.

9. A retardation film according to claim 8, wherein the polymer film contains as a main component a polyvinyl acetal-based resin having a chemical structure represented by the following general formula (III):

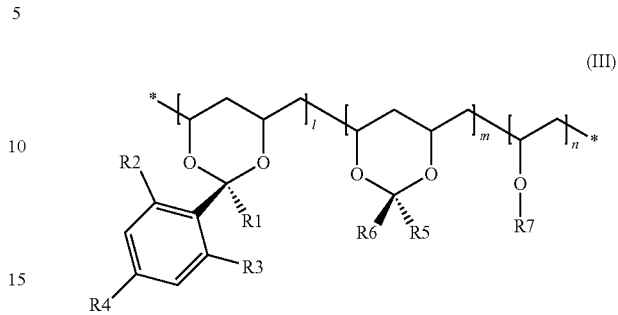

(III)

in the general formula (III): R1, R5, and R6 each independently represent a hydrogen atom, a straight, branched, or cyclic alkyl group having 1 to 8 carbon atoms, a substituted or unsubstituted phenyl group, a substituted or unsubstituted naphthyl group, a substituted or unsubstituted anthranyl group, or a substituted or unsubstituted phenanthrenyl group; R2, R3, and R4 each independently represent a hydrogen atom, a straight, branched, or cyclic alkyl group having 1 to 4 carbon atoms, a straight or branched alkoxy group having 1 to 4 carbon atoms, a halogen atom, a halogenated alkyl group, a nitro group, an amino group, a hydroxyl group, a cyano group, or a thiol group; R2 and R3 are not hydrogen atoms simultaneously; R7 represents a hydrogen atom, a straight, branched, or cyclic alkyl group having 1 to 8 carbon atoms, a benzyl group, a silyl group, a phosphoric group, an acyl group, a benzoyl group, or a sulfonyl group; and 1, m, and n each represent an integer of 1 or more.

10. A retardation film according to claim 9, wherein l is 5 to 30 mol %, m is 20 to 80 mol %, and n is 1 to 70 mol % with respect to a total of l, m, and n as 100 mol %.

11. A polarizing element comprising:
a retardation film and a polarizer, wherein:
the retardation film comprises a stretched film of a polymer film having an absolute value of photoelastic coefficient ($m^2$/N) of $50 \times 10^{-12}$ or less measured by using light of a wavelength of 550 nm at 23° C.; and
the retardation film satisfies the following expressions (1) and (2):

Re[450]<Re[550]<Re[650]     (1)

Rth[550]<Re[550]     (2)

in the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.; and
which has an Nz coefficient of 0.2 to 0.8;
wherein the Nz coefficient is a ratio of Rth[550]/Re[550] between the thickness direction retardation value and the in-plane retardation value measured by using light of a wavelength of 550 nm at 23° C.

12. A polarizing element according to claim 11, wherein the retardation film and the polarizer are laminated directly.

13. A polarizing element according to claim 11, wherein the retardation film and the polarizer are laminated through an adhesive layer.

14. A polarizing element according to claim 11, further comprising a protective layer between the retardation film and the polarizer.

15. A liquid crystal panel comprising:
a polarizing element including a retardation film and a polarizer; and
a liquid crystal cell, wherein:
the retardation film in the polarizing element comprises a stretched film of a polymer film having an absolute value of photoelastic coefficient ($m^2/N$) of $50\times10^{-12}$ or less measured by using light of a wavelength of 550 nm at 23° C.; and
the retardation film satisfies the following expressions (1) and (2):

$$Re[450]<Re[550]<Re[650] \quad (1)$$

$$Rth[550]<Re[550] \quad (2)$$

in the expressions (1) and (2): Re[450], Re[550], and Re[650] respectively represent in-plane retardation values measured by using light of wavelengths of 450 nm, 550 nm, and 650 nm at 23° C.; and Rth[550] represents a thickness direction retardation value measured by using light of a wavelength of 550 nm at 23° C.; and
which has an Nz coefficient of 0.2 to 0.8;
wherein the Nz coefficient is a ratio of Rth[550]/Re[550] between the thickness direction retardation value and the in-plane retardation value measured by using light of a wavelength of 550 nm at 23° C.

16. A liquid crystal panel according to claim 15, wherein the polarizing element is arranged on one side of the liquid crystal cell.

17. A liquid crystal panel according to claim 15, wherein the polarizing element is arranged on both sides of the liquid crystal cell.

18. A liquid crystal panel according to claim 15, which is a liquid crystal panel of a drive mode selected from the group consisting of a TN mode, a VA mode, an IPS mode, a homogeneous ECB mode, an OCB mode, and an HAN mode.

19. A liquid crystal display apparatus comprising the liquid crystal panel according to claim 15.

* * * * *

UNITED STATES PATENT AND TRADEMARK OFFICE
CERTIFICATE OF CORRECTION

| | | |
|---|---|---|
| PATENT NO. | : 7,625,612 B2 | Page 1 of 1 |
| APPLICATION NO. | : 11/344577 | |
| DATED | : December 1, 2009 | |
| INVENTOR(S) | : Ohmori et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this

Second Day of November, 2010

David J. Kappos
*Director of the United States Patent and Trademark Office*